(12) United States Patent
Eckman et al.

(10) Patent No.: US 12,260,501 B2
(45) Date of Patent: Mar. 25, 2025

(54) POINT CLOUD FILTERING

(71) Applicant: Lineage Logistics, LLC, Irvine, CA (US)

(72) Inventors: Christopher Frank Eckman, San Francisco, CA (US); Brady Michael Lowe, Pocatello, ID (US); Alexander Hall, Rexburg, ID (US)

(73) Assignee: Lineage Logistics, LLC, Irvine, CA (US)

( * ) Notice: Subject to any disclaimer, the term of this patent is extended or adjusted under 35 U.S.C. 154(b) by 0 days.

(21) Appl. No.: 18/651,960

(22) Filed: May 1, 2024

(65) Prior Publication Data

US 2024/0355048 A1 Oct. 24, 2024

Related U.S. Application Data

(63) Continuation of application No. 18/339,424, filed on Jun. 22, 2023, now Pat. No. 12,002,156, which is a
(Continued)

(51) Int. Cl.
*G06T 17/00* (2006.01)
*G06F 18/23* (2023.01)
(Continued)

(52) U.S. Cl.
CPC .............. *G06T 17/05* (2013.01); *G06F 18/23* (2023.01); *G06T 17/20* (2013.01); *G06V 20/176* (2022.01); *G06V 20/182* (2022.01); *G06V 20/188* (2022.01)

(58) Field of Classification Search
None
See application file for complete search history.

(56) References Cited

U.S. PATENT DOCUMENTS 9,165,360 B1 10/2015 Bates et al.
10,066,925 B2 9/2018 Kurtz et al.
(Continued)

FOREIGN PATENT DOCUMENTS

CN 103902977 A 7/2014
CN 106485253 A 3/2017
(Continued)

OTHER PUBLICATIONS

Office Action in Chinese Application No. 20228003287.2, dated Mar. 8, 2024, with English translation, 10 pages.
(Continued)

*Primary Examiner* — Martin Mushambo
(74) *Attorney, Agent, or Firm* — Barnes & Thornburg LLP

(57) ABSTRACT

This specification describes systems and methods for refining point cloud data. Methods can include receiving point cloud data for a physical space, iteratively selecting points along an x, y, and z dimension, clustering the selected points into 2D histograms, determining a slope value for each 2D histogram, and removing, based on the slope value exceeding a predetermined value, points from the point cloud data. Methods can also include iteratively voxelizing each 2D histogram into predetermined mesh sizes, summating points in each voxelized 2D histogram, removing, based on determining the summation is below a predetermined sum value, points from the point cloud data, keeping, based on determining that a number of points in each voxelized 2D histogram exceeds a threshold value, a center point, selecting, for each histogram, a point, identifying, nearest neighbors in the point cloud data, removing the identified nearest neighbors from the data, and returning remaining points.

20 Claims, 18 Drawing Sheets

Related U.S. Application Data continuation of application No. 17/862,167, filed on Jul. 11, 2022, now Pat. No. 11,734,884, which is a continuation of application No. 17/230,730, filed on Apr. 14, 2021, now Pat. No. 11,403,817.

(51) Int. Cl.
  *G06T 17/05* (2011.01)
  *G06T 17/20* (2006.01)
  *G06V 20/10* (2022.01)

(56) References Cited

U.S. PATENT DOCUMENTS

| | | |
|---|---|---|
| 11,403,817 B1 | 8/2022 | Eckman et al. |
| 2007/0276228 A1 | 11/2007 | Vining et al. |
| 2013/0127844 A1 | 5/2013 | Koeppel et al. |
| 2015/0063683 A1 | 3/2015 | Fu |
| 2016/0203263 A1 | 7/2016 | Maier et al. |
| 2017/0358087 A1 | 12/2017 | Armeni et al. |
| 2018/0033160 A1 | 2/2018 | Ishigami |
| 2019/0125493 A1 | 5/2019 | Salah et al. |
| 2019/0279420 A1* | 9/2019 | Moreno ............... G06T 17/10 |
| 2019/0285752 A1* | 9/2019 | Chattopadhyay ...... G06V 10/25 |
| 2020/0043186 A1 | 2/2020 | Selviah et al. |
| 2020/0111251 A1 | 4/2020 | Shi et al. |
| 2020/0200912 A1 | 6/2020 | Chen et al. |
| 2020/0210680 A1 | 7/2020 | Shreve et al. |
| 2020/0302241 A1 | 9/2020 | White et al. |
| 2020/0388044 A1 | 12/2020 | Cen et al. |
| 2021/0233284 A1 | 7/2021 | Sugio et al. |
| 2021/0354718 A1 | 11/2021 | Lu et al. |
| 2021/0365712 A1 | 11/2021 | Lu et al. |
| 2021/0373161 A1 | 12/2021 | Lu et al. |
| 2021/0383096 A1 | 12/2021 | White et al. |
| 2022/0351464 A1 | 11/2022 | Eckman et al. |

FOREIGN PATENT DOCUMENTS

| | | |
|---|---|---|
| CN | 107016705 A | 8/2017 |
| CN | 107038717 A | 8/2017 |
| CN | 112149677 A | 12/2020 |

OTHER PUBLICATIONS

International Search Report and Written Opinion in International Appln. No. PCT/US2022/024710, mailed on Aug. 2, 2022, 16 pages.

* cited by examiner

FIG. 2C
FIG. 2B

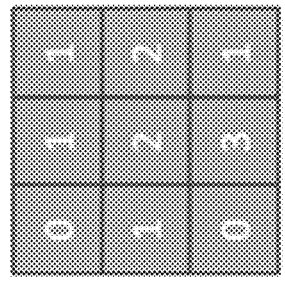
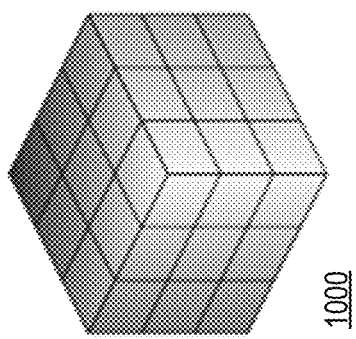
FIG. 10A

POINT CLOUD FILTERING

CROSS REFERENCE TO RELATED APPLICATIONS

This application is a continuation of U.S. patent application Ser. No. 18/339,424, filed Jun. 22, 2023, which is a continuation of U.S. patent application Ser. No. 17/862,167, filed Jul. 11, 2022 and issued on Aug. 22, 2023 as U.S. Pat. No. 11,734,884, which is a continuation of U.S. patent application Ser. No. 17/230,730, filed Apr. 14, 2021 and issued on Aug. 2, 2022 as U.S. Pat. No. 11,403,817, the contents of which applications are incorporated herein by reference in their entirety.

TECHNICAL FIELD

This document generally describes technology for refining point clouds, which can include collections of points in three dimensional space.

BACKGROUND

Physical spaces, such as warehouses and storage facilities, can be large and challenging to navigate. Mapping such physical spaces can assist users, such as warehouse workers, to learn a floorplan of a physical space and to move around that physical space without getting lost. Generating a blueprint or map of a physical space can be performed by users walking around the physical space with a scanner to acquire 3D scans and/or images of the entire physical space. The 3D scans and/or images can then be manually transformed into blueprints or maps of the physical space. Such blueprints or maps can be manually updated by users whenever changes are made to the physical space.

Manual mapping can be a time-consuming process and can include inaccuracies due to human error. For example, a user may not acquire images of every region of the physical space. Thus, a map can include certain regions of the physical space but not others. As another example, a user may not acquire updated images of regions of the physical space where changes are made. Thus, the map can be outdated and the users can be relying on the outdated map. Modern day blueprints and maps of physical spaces can be inaccurate, lacking detail, or missing all together.

SUMMARY

This document generally describes technology for refining point clouds so that they more accurately represent physical structures within a 3D space. Refined point clouds can be used to more effectively and efficiently generate blueprints and/or maps of a physical space. Point clouds can be generated from images and/or other representations of a physical space. The point clouds can be include points that provide rough approximations of physical structures and surfaces within the physical space and their corresponding locations relative to each other. The point clouds can include some noise and inaccurate points, which can hinder the use of the point clouds for accurately mapping the physical structures and their corresponding contours within a physical space. The disclosed technology can eliminate much if not all of the noise to provide a refined point cloud that more accurately corresponds to and highlights the contours and relative locations of physical structures within a physical space.

In some implementations, the disclosed technology can provide for selecting an axis of point cloud data to initially operate on. From each axis, entire sections of the point cloud can be compressed into a series of two dimensional (2D) histograms. The histograms can be examined like a kernel, which can result in voxels defined in 3D space being evaluated. A predefined threshold can be used to determine whether an individual point within a voxel should be added to the final, filtered point cloud output. For example, if a center of an examined voxel was an existing point, then the points within the voxel can be summed and compared against the threshold. If summation of the points within the voxel are above the threshold, then the point can be added to the final, filtered point cloud output. If not, then the point may be omitted from the final, filtered cloud output. After completing the filtering from each of the 3 axes (x-axis, y-axis, and z-axis), nearest neighbors can be used to remove the selected points and N distance neighbors from the original cloud. The filter can then be applied (using the same and/or different parameters) to the resulting reduced cloud. This process can be repeated multiple times tuned to pull out specific features each pass. The final resulting cloud can be combined to form a subsampled point cloud. This final subsampled cloud can be input into, for example, a k-means filter to enhance the physical features that were found through initial filtering process.

The points clouds described herein can be generated from 3D scans and/or images of the physical space. The physical space can be a warehouse environment, a storage facility, a building, house, and/or other structure. In some implementations, the physical space can be an outdoor environment, such as a section of a town and/or some other environment that is surveyed. As described herein, the point cloud can be refined using techniques such as histogram filtering, k-means filtering, and slicing filtering. The disclosed technology can apply histogram filtering to the point cloud to remove noise (e.g., outlier points). The disclosed technology can analyze a resulting point cloud and determine a distribution of point density within the point cloud to determine whether to up-sample portions of the point cloud and/or down-sample portions of the point cloud. Up-sampling and/or down-sampling the point cloud can facilitate creation of a more even distribution of points and a more refined depiction of objects within the physical environment.

Up-sampling can be advantageous where an area of the point cloud has a low density of points (e.g., the density is below a predetermined threshold value for a desired density). Therefore, up-sampling requires populating portion(s) of the point cloud with additional points. Up-sampling can be accomplished by applying a k-means filter to portions of the point cloud. Down-sampling can be advantageous where an area of the point cloud has a high density of points (e.g., the density exceeds the predetermined threshold value for the desired density). Therefore, down-sampling requires removing points from populated portion(s) of the point cloud. Down-sampling can be accomplished by applying a slicing filter to portions of the point cloud. Applying the filtering techniques disclosed herein can refine the point cloud such that the point cloud has an optimal (e.g., minimal, necessary) number and density of points to identify features and objects within the physical space.

Once the point cloud is filtered and refined, the point cloud can be used to identify features and objects in the physical space, such as poles and racks in the warehouse environment, and/or buildings and roads in an outdoor environment. The disclosed technology can also assign confidence values/scores to the identified items and use such values to solve for missing objects, missing portions of identified objects, and/or generate more accurate and updated maps of the physical space.

Therefore, using the refined point cloud, more accurate representations of the physical space can be generated, including but not limited to the physical space's footprint (e.g., blueprint, map, floorplan, etc.), cubic footage, wall positions, rack positions, aisles, hallways, etc. The disclosed technology can also be used to update and/or renew maps of the physical space in real-time, periodically, and/or automatically.

Particular embodiments described herein can include systems and methods for refining point cloud data. The particular embodiments can include receiving, by a computing system, point cloud data for a physical space, the point cloud data including a plurality of points in three-dimensional space that approximate locations of physical surfaces within the physical space, iteratively selecting points from the plurality of points along an x, y, and z dimension, and clustering the selected points into one or more two dimensional ("2D") histograms. The embodiments can also include determining a slope value for each of the 2D histograms, removing, based on determining that the slope value exceeds a predetermined slope value, points from the point cloud data, iteratively voxelizing each of the 2D histograms into predetermined mesh sizes, summating, based on identifying a center point in each of the voxelized 2D histograms, points in each of the voxelized 2D histograms, and removing, based on determining that the summation of points in each of the voxelized 2D histograms is below a predetermined sum value, points from the point cloud data. The embodiments also include determining a number of points in each of the voxelized 2D histograms, determining whether the number of points in each of the voxelized 2D histograms exceeds a predetermined threshold value, and keeping, in response to determining that the number of points in each of the voxelized 2D histograms exceeds the predetermined threshold value, a center point for each of the voxelized 2D histograms. The embodiments include selecting, for each of the voxelized 2D histograms, a point from amongst the center points, identifying, for the point, nearest neighbors in the point cloud data, removing the identified nearest neighbors from the point cloud data, and returning, by the computing system, remaining points in the point cloud data.

In some implementations, the particular embodiments can optionally include one or more of the following features. For example, the embodiments can further include performing a standard distribution on a density of points in each of the voxelized 2D histograms, and determining whether the standard distribution on the density of points for each of the voxelized 2D histograms exceeds a predetermined density distribution value. The embodiments can include removing, based on determining that the standard distribution on the density of points for each of the voxelized 2D histograms exceeds the predetermined density distribution value, points from the voxelized 2D histogram of the point cloud data, and adding, based on determining that the standard distribution on the density of points for each of the voxelized 2D histograms is below the predetermined density distribution value, points to the voxelized 2D histogram of the point cloud data. In some implementations, adding points to the voxelized 2D histogram of the point cloud data can include applying a k-means filter. Removing points from the voxelized 2D histogram of the point cloud data can include applying a slicing filter.

As another example, points that are removed from the point cloud data based on determining that the summation of points in each of the voxelized 2D histograms is below a predetermined sum value can be outlier points. The outlier points may not comprise the physical surfaces within the physical space. The predetermined mesh sizes can also be determined based at least in part on a number of points in the point cloud data and types of the physical surfaces within the physical space.

In some implementations, the embodiments can include aligning the point cloud data along x, y, and z dimensions that correspond to an orientation of the physical space that is represented by the point cloud data, classifying the points in the point cloud data as corresponding to one or more types of physical surfaces, identifying specific physical structures in the physical space based, at least in part, on classifications for the points in the point cloud data, and generating, by the computing system, a map of the physical space based on the specific physical structures and corresponding contours of the specific physical structures within the orientation of the physical space.

The embodiments can also include identifying a number of nearest neighbor points for each of the 2D histograms, and determining whether the number of nearest neighbor points includes a predetermined quantity of reoccurring points. The reoccurring points can be located in a same position along x, y, and z dimensions. The embodiments can also include generating points near the reoccurring points of the nearest neighbor points based on determining that the number of nearest neighbor points includes the predetermined quantity of reoccurring points.

In some implementations, the physical surfaces within the physical space can include pallets, racks, shelves, buildings, houses, trees, plants, and roads. The physical space can also include a warehouse, storage facility, and outdoor environment.

The disclosed technology can provide numerous advantages. For example, the disclosed technology can provide filtering methods that result in more accurate and refined points clouds. The more accurate and refined point clouds can be used to generate more accurate blueprints and/or maps of a physical space. The more accurate blueprints and/or maps can be used to identify objects and features within the physical space.

As another example, the disclosed technology can automate a process for generating blueprints and/or maps of the physical space by using filtered and refined point clouds. Automating the filtering, refinement, and generation processes can be advantageous to mitigate or otherwise remove human error in manually performing these processes. Automation can also reduce an amount of time needed to perform the abovementioned processes. The disclosed technology further can allow for continuous updating and/or renewing of the blueprints and/or maps without human intervention. Consequently, the disclosed technology can be used to more accurately determine process flows, movement, and/or other features specific to the physical space while the physical space is occupied and/or used for its intended purpose(s).

Moreover, the disclosed technology can fill in gaps in missing data, which can be beneficial in later calculations that attempt to classify and localize objects within the point cloud. Filling in the gaps can also be beneficial to render software or other tools for making 3D images or simulations from the point cloud data. The disclosed technology can provide for interpolation of a point cloud since gaps can be filled in with missing data points. The interpolation as described herein can extend points into regions of the point cloud where points were not previously present. Such interpolation can be performed on a small scale to avoid generation of fake or unrealistic surfaces. Thus, using the disclosed technology, point clouds can be refined and used to more accurately identify objects and features within physical spaces.

The details of one or more embodiments are set forth in the accompanying drawings and the description below. Other features and advantages will be apparent from the description and drawings, and from the claims.

BRIEF DESCRIPTION OF DRAWINGS

FIGS. 2B-C depict exemplary results from filtering the point cloud using a histogram filter and a k-means filter.

FIGS. 10A-E are exemplary depictions of voxelizing the point cloud.

DETAILED DESCRIPTION

This document generally describes filtering and refining point clouds using techniques such as k-means filtering, histogram filtering, and slicing. The refined point clouds can then be used to more accurately identify objects and features within physical spaces. Moreover, the refined point clouds can be used to generate more accurate 3D images or simulations of physical spaces as well as blueprints and/or maps of such physical spaces.

Figure 1A:
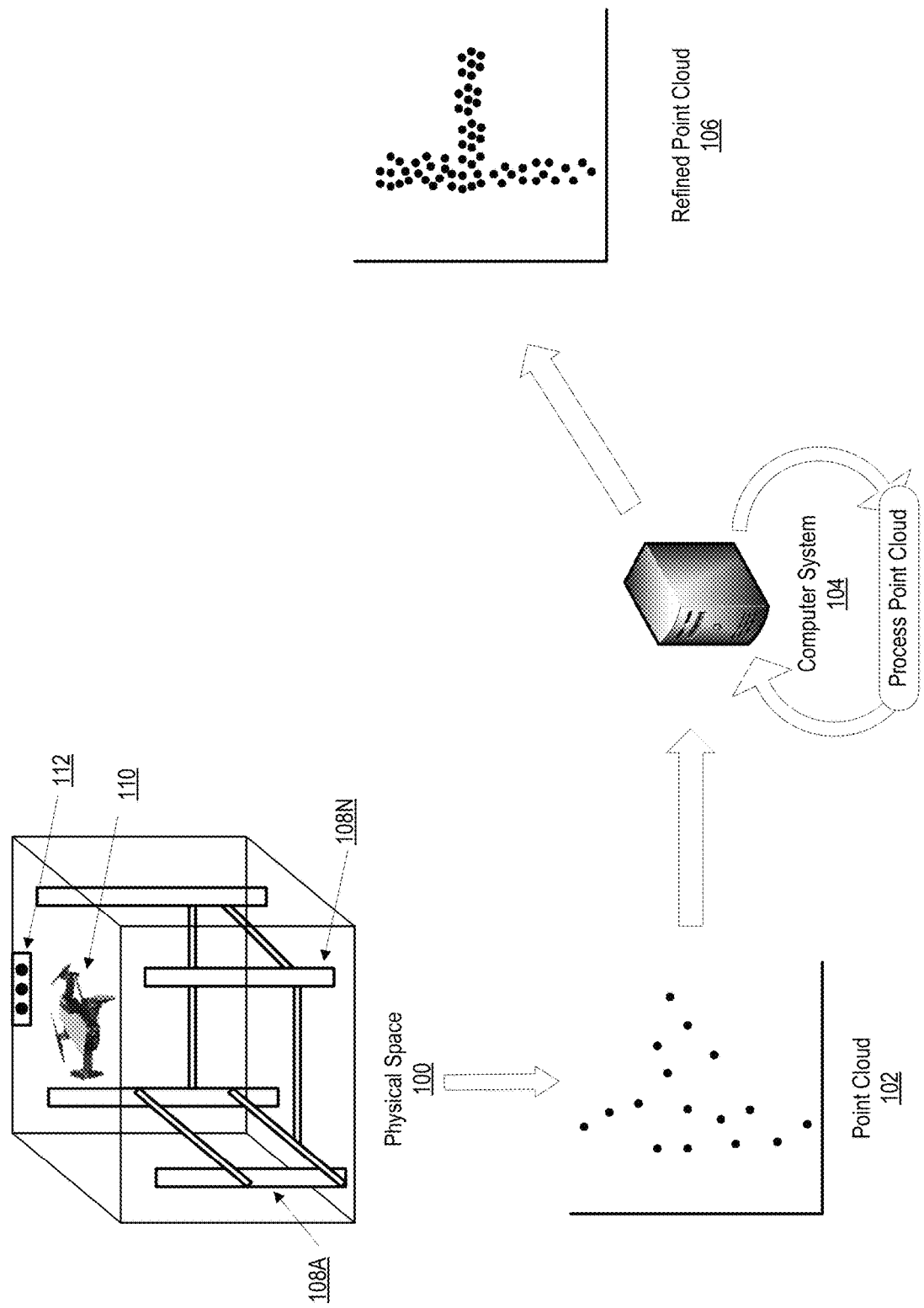
FIG. 1A depicts an exemplary point cloud filtering system.

Referring to the figures, FIG. 1A depicts an exemplary point cloud filtering system, including a physical space 100, a point cloud 102, a computer system 104, and a refined point cloud 106. As depicted, the physical space 100 can be a warehouse environment. The physical space 100 can include one or more racks 108A-N. In other implementations, the physical space 100 can include one or more other types of physical items other than racks 108A-N. For example, the physical space 100 can include walls, doorways, doors, tables, support beams, etc. In some implementations, the physical space 100 can be any type of storage facility (e.g., freezer). In yet other implementations, the physical space 100 can be a building, house, other structure, or an outdoor space/landscape. Still referring to FIG. 1A, the physical space 100 further includes a drone 110 and a stereoscopic camera 112. In some implementations, the physical space 100 can include multiple drones 110 and/or stereoscopic cameras 112. The drone 110 and the stereoscopic camera 112 can be configured to capture one or more 3D scans and/or images of the entire physical space 100. In some implementations, instead of at least one of the drone 110 and/or the stereoscopic camera 112, the physical space 100 can employ a person, forklift, and/or some type of device to capture 3D scans and/or images of the physical space 100.

Once the one or more 3D scans and/or images of the physical space 100 are captured, they can be used to generate one or more point clouds 102. The one or more point clouds 102 can be generated by the drone 110, a device in the physical space 100 that is used for capturing 3D scans/images, and/or any other computer system/computing device in communication with the drone 110, the stereoscopic camera 112, and/or the computer system 104. The one or more point clouds 102 can then be transmitted/communicated to the computer system 104. Communication described throughout this disclosure can occur via a network and/or a wireless/wired communication (e.g., BLUETOOTH, WIFI, Ethernet, etc.). In some implementations, the one or more point clouds 102 can be generated by the computer system 104.

At the computer system 104, the point cloud 102 can be processed (e.g., filtered, cleaned, refined) using techniques described throughout this disclosure to generate the refined point cloud 106 (refer to FIGS. 2-8). The refined point cloud 106 can be used, by the computer system 104 and/or another computer system/computing device in communication with the computer system 104, to generate a map of the physical space. The map of the physical space can be an accurate map and/or blueprint that is updated in real-time, periodically, and/or automatically.

Still referring to FIG. 1A, the process of scanning the physical space 100, generating the point cloud 102, processing the point cloud 102, and outputting the refined point cloud 106 can be performed in real-time and/or at different times. For example, 3D scans and/or images of the physical space 100 can be captured at a time 1. The point cloud 102 can be generated at a time 2. Processing the point cloud at the computer system 104 to generate the refined point cloud 106 can be performed at a time 3. And finally, generating the map of the physical space can be performed at a time 4 (not depicted). Moreover, the described process can be performed more than once and can be automatically/periodically performed in order to ensure accurate and updated point clouds of the physical space 100 are maintained.

Figure 1B:
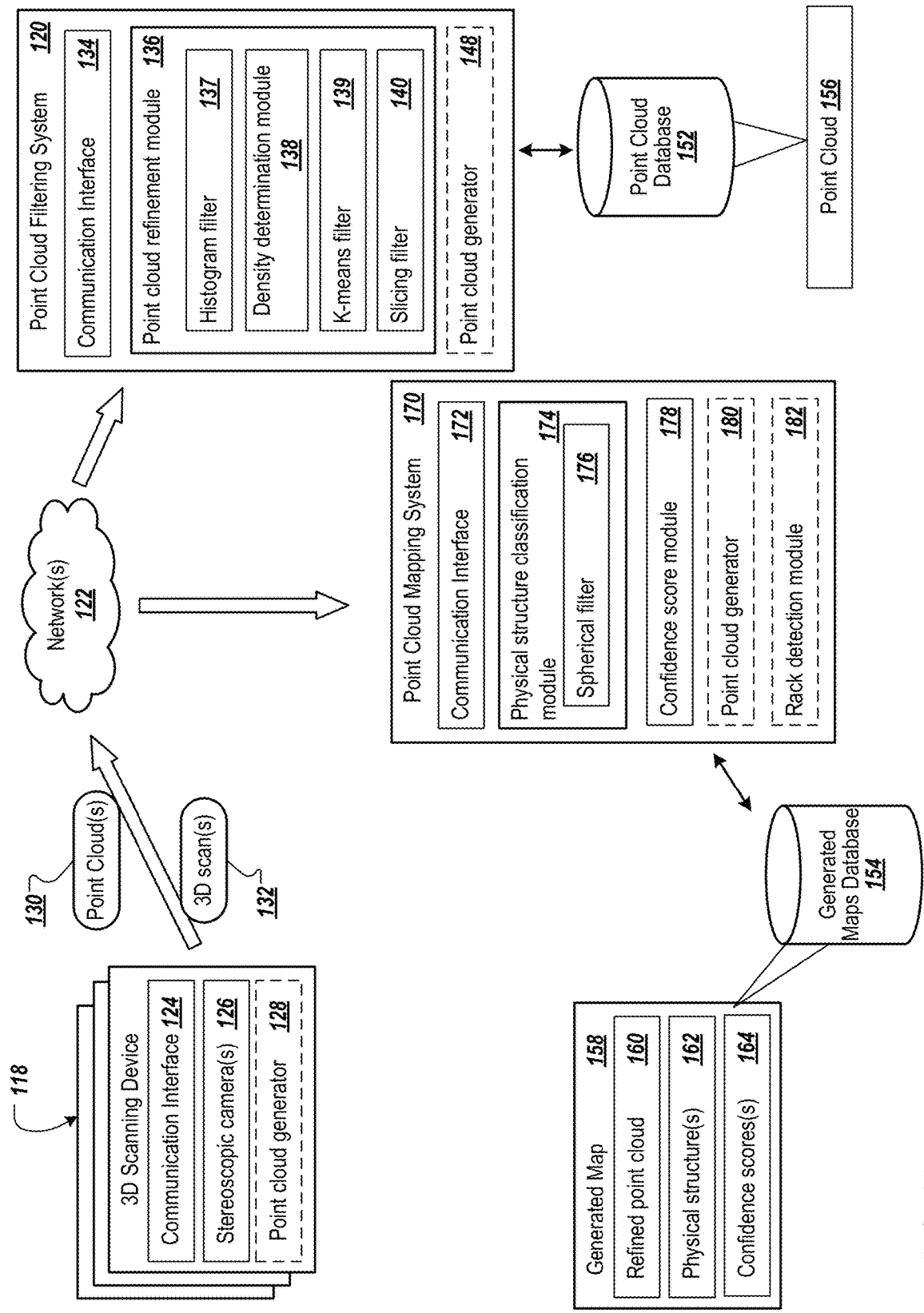
FIG. 1B depicts an exemplary system diagram of the disclosed invention.

FIG. 1B depicts an exemplary system diagram of the disclosed invention. As depicted, a 3D scanning device 118, a point cloud filtering system 120, and a point cloud mapping system 170 can be in communication via a network 122, as discussed in FIG. 1A. In some implementations, the point cloud mapping system 170 can be optionally integrated into the system described throughout this disclosure. In other words, an exemplary system having the 3D scanning device 118 and the point cloud filtering system 120 may not have the point cloud mapping system 170.

One or more 3D scanning devices can be in communication with the point cloud filtering system 120 and/or the point cloud mapping system 170 via the network 122. The 3D scanning device 118 can be at least one of the drone 110 and the stereoscopic camera 112 previously discussed in reference to FIG. 1A. Moreover, the filtering system 120 can be the computer system 104 disclosed in FIG. 1A. In some implementations, the mapping system 170 can be the computer system 104 disclosed in FIG. 1A. In yet other implementations, the filtering system 120 and the mapping system 170 can be integrated into one system, such as the computer system 104 disclosed in FIG. 1A.

The 3D scanning device 118 can include a communication interface 124, at least one stereoscopic camera 126, and an optional point cloud generator 128. The communication interface 124 can facilitate communication between the 3D scanning device 118 and the filtering system 120 and/or the mapping system 170 over the network 122, as discussed. The at least one stereoscopic camera 126 can capture one or more 3D scans and/or other images of a physical space. In some implementations, the 3D scanning device 118 can have, instead of or in combination with the stereoscopic camera 126, other types of image capturing sensors, cameras, and/or devices configured to capture 3D scans and/or images of the physical space. As mentioned, the 3D scanning device 118 can optionally include the point cloud generator 128, configured to generate a point cloud from the captured 3D scans/images. If the 3D scanning device 118 includes the point cloud generator 128 and generates point clouds, those points clouds 130 can be transferred/communicated to the point cloud filtering system 120 and/or the mapping system 170 via the network 122. The point cloud filtering system 120 can then store such point cloud(s) 130 in a point cloud database 152. The point cloud database 152 stores generated point clouds, as indicated by exemplary point cloud 156. If the 3D scanning device 118 does not generate point clouds, then 3D scan(s) 132 can be transferred/communicated from the device 118 to the point cloud filtering system 120 via the network 122. In some implementations, the device 118 can transfer both point cloud(s) 130 and 3D scan(s) 132 to the point cloud filtering system 120.

The point cloud filtering system 120 can use the received 3D scan(s) to generate one or more point clouds via a point cloud generator 148. Thus, the filtering system 120 can optionally include a point cloud generator 148. In some implementations, the filtering system 120 can receive point clouds 130 and 3D scans 132 from the 3D scanning device 118 as well as generate additional point clouds based on the received 3D scan(s) 132. Doing so can increase accuracy of the point clouds, which can further reduce how much filtering/refining is required to generate accurate blueprints and/or maps of a physical space.

Still referring to FIG. 1B, the point cloud filtering system 120 can include a communication interface 134, a point cloud refinement module 136, and the optional point cloud generator 148 previously mentioned. The filtering system 120 can be in communication, via the communication interface 134 and over the network 122, with the 3D scanning device 118, the mapping system 170, the point cloud database 152, and/or any additional computer systems.

Once the filtering system 120 generates a point cloud (via the point cloud generator 148) and/or receives the point cloud 130 from the 3D scanning device 118, the point cloud can be refined at the point cloud refinement module 136, as described further throughout this disclosure. The point cloud refinement module 136 can include a histogram filter 137 (refer to FIGS. 3A-C), a density determination module 138 (refer to FIGS. 6-7), a k-means filter 139 (e.g., k-guided filter) (refer to FIGS. 4A-B, 8A-B), and a slicing filter 140 (refer to FIGS. 7-8). Filters and modules 137, 138, 139, and 140 can be used separately and/or in combination to clarify and clean up the point cloud. The histogram filter 137 can be used to cluster/voxelize points in the point cloud as well as remove outlier points from the point cloud. The density determination module 138 can be used to perform statistical distribution of point density in the point cloud to determine whether portions of the point cloud need to be up-sampled and/or down-sampled. Based on determinations made by the module 138, the k-means filter 139 can be applied to portions of the point cloud in order to up-sample such portions and/or the slicing filter 140 can be applied to portions of the point cloud in order to down-sample such portions. The refined point cloud can then be stored in the point cloud database 152. The database 152 can store a plurality of refined point clouds 156.

The optional point cloud mapping system 170 can communicate with the filtering system 120 via the network 122 in order to receive the refined point cloud(s). The mapping system 170 can include a communication interface 172, a physical structure classification module 174, a confidence score module 178, an optional point cloud generator 180, and an optional rack detection module 182. In some implementations, such as when the mapping system 170 communicates directly with the 3D scanning device 118, the point cloud generator 180 can generate point clouds based on 3D scans 132 received from the device 118. In other implementations, the mapping system 170 can receive the generated and refined point clouds from the filtering system 120. The mapping system 170 can further be in communication with a generated map database 154. Maps/blueprints that are generated by the mapping system 170 and based off point clouds can be stored within the database 154. An exemplary generated map 158 can include a refined point cloud 160, physical structure(s) 162, and confidence score(s) 164.

Still referring to the mapping system 170, upon receiving the refined point cloud from the filtering system 120, the refined point cloud can go through the physical structure classification module 174 to identify and classify any physical structures/items/objects within the point cloud. The module 174 can include a spherical filter 176 for identifying and classifying physical structures. The confidence score module 178 can further be used to determine scores for identified physical structures and overall accuracy of the refined point cloud. Finally, the rack detection module 182 can be used to identify vertical poles and racks from the point cloud. The module 182 is beneficial for determining racks in a warehouse environment or other type of storage facility. In other implementations, the module 182 can be directed towards identifying other types of items/objects located within a physical space, such as trees or roads in an outdoor environment. Once any determinations (e.g., a refined point cloud, final map, classification and scores of physical structures, etc.) are made, such determinations can be stored in the generated maps database 154. The database 154 can store a plurality of generated maps 158.

Figure 2A:
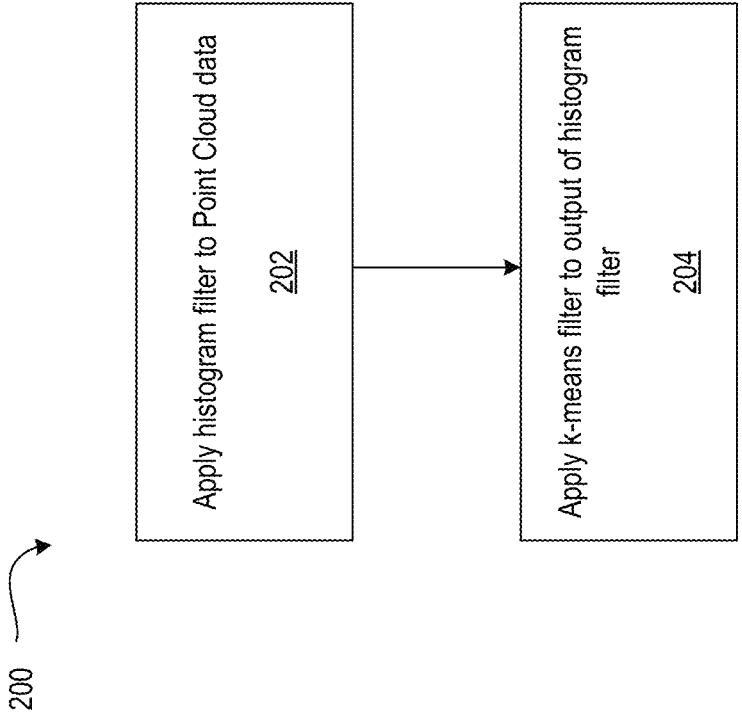
FIG. 2A is a flowchart of a process for filtering the point cloud.

FIG. 2A is a high-level flowchart of a process 200 for filtering the point cloud. The process 200 can be performed by a computing device, such as the computer system 104 (refer to FIG. 1A) and/or the point cloud filtering system 120 (refer to FIG. 1B). First, the computer system applies a histogram filter (discussed in FIGS. 3A-B) to the point cloud (step 202). The histogram filter is beneficial to remove any noise, or outlier points, from the point cloud. The computer system also can apply a k-means filter (discussed in FIGS. 4A-B) to an output of the histogram filter (step 204). The k-means filter is beneficial to further refine the point cloud by adding points to portions of the point cloud indicative of an object/item within a physical space.

In some implementations, steps 202 and 204 can be performed in any order and/or simultaneously. In some implementations, only one of the steps 202 and 204 can be performed. For example, as described in reference to FIGS. 5, 7, and 8A-B, the point cloud can be analyzed using histogram filtering techniques (step 202), and then either a k-means filter (step 204) and/or a slicing filter can be applied to up-sample and/or down-sample the point cloud, respectively. In some implementations, the k-means filter can be applied to portions of the point cloud while the slicing filter can be applied to other portions of the point cloud. Using both the k-means filter and the slicing filter can be beneficial to ensure that the point cloud has an optimal distribution of points and that those points accurately represent objects/items within the physical space.

FIGS. 2B-C depict exemplary results from filtering the point cloud using the histogram filter and the k-means filter (refer to FIG. 2A). FIG. 2B depicts a 3D scan of an outdoor physical space before refinement. FIG. 2B's 3D scan is of a street with buildings, parking lots, houses etc. As shown, the scan is not refined or detailed enough for one to identify what each of the objects and/or shapes are in the scan. FIG. 2C depicts the same 3D scan after it is refined with the filtering techniques, such as histogram filtering and k-means filtering. As a result of such filtering/refinement, one can more easily identify each of the objects/scans in the 3D scan.

Differing colors in the scan indicate a confidence score for each of the identified objects/shapes. For example, a purpose of the 3D scan in FIGS. 2B-C can be to identify buildings and houses for a land surveying project. When an object/shape in this scan is red, it is more likely to be one of the identified things (e.g., 90% accurate identification post-filtering). In the example of FIG. 2C, the red squares and rectangles represent buildings and homes. Objects, shapes, and/or space that appear in green are a little less likely to be one of the identified things (e.g., 80% accurate identification post-filtering). And, objects, shapes, and/or space that appears in blue are even less likely to be one of the identified things (e.g., 50% accurate). Thus, streets, parking lots, and other open spaces appear in blue in FIG. 2C since they are the least likely to be representative of buildings and homes.

Similar results as those shown in FIGS. 2B-C can be attained by using the 3D scanning and filtering techniques discussed throughout this disclosure in different settings. For example, 3D scans can be captured of rooms in a building, a warehouse, and/or any other physical environment to achieve comparable results.

Figure 3A:
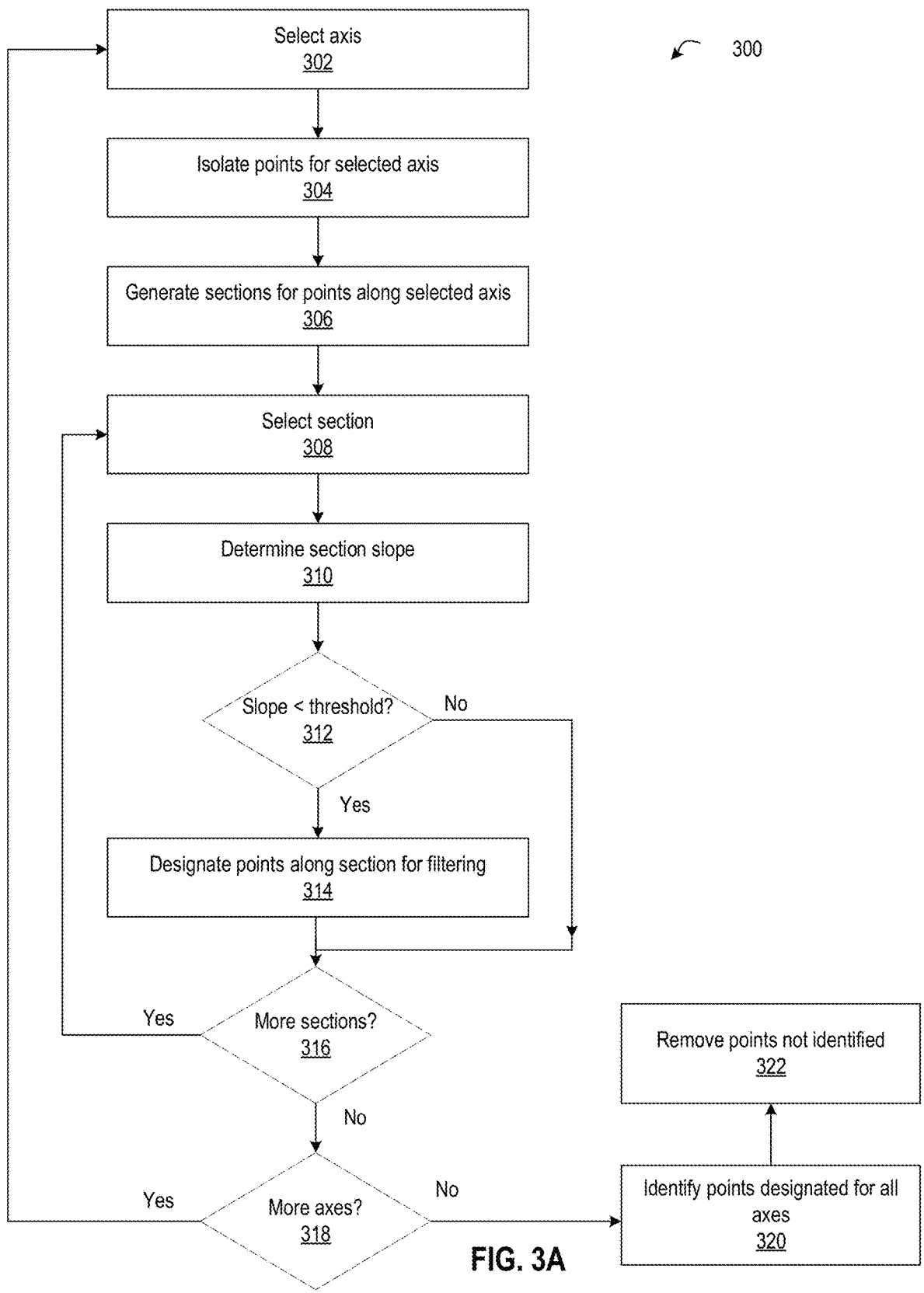
FIG. 3A is a flowchart of a process for a histogram filter algorithm.
Figure 3C:
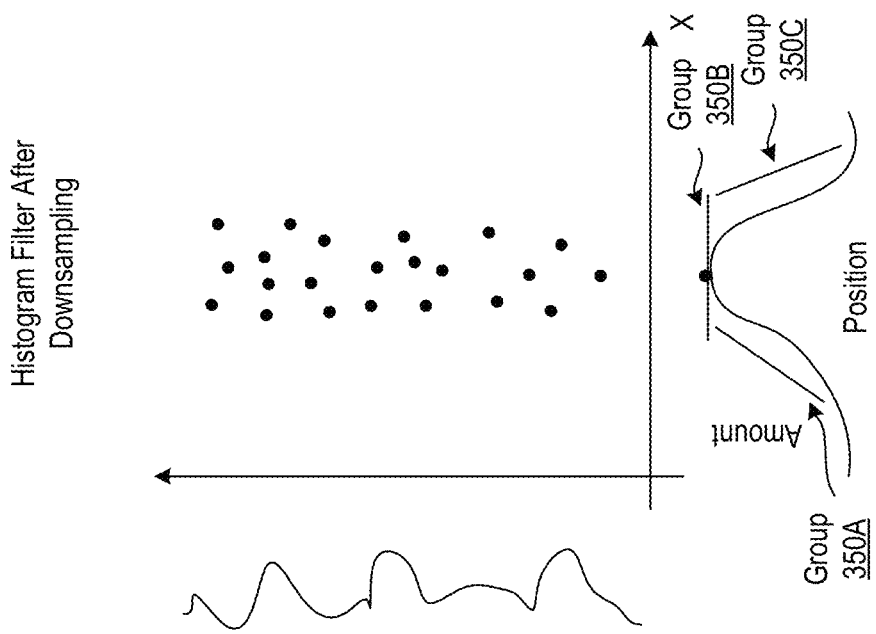
FIGS. 3B-C are graphical depictions of the histogram filter during implementation.
Figure 3B:
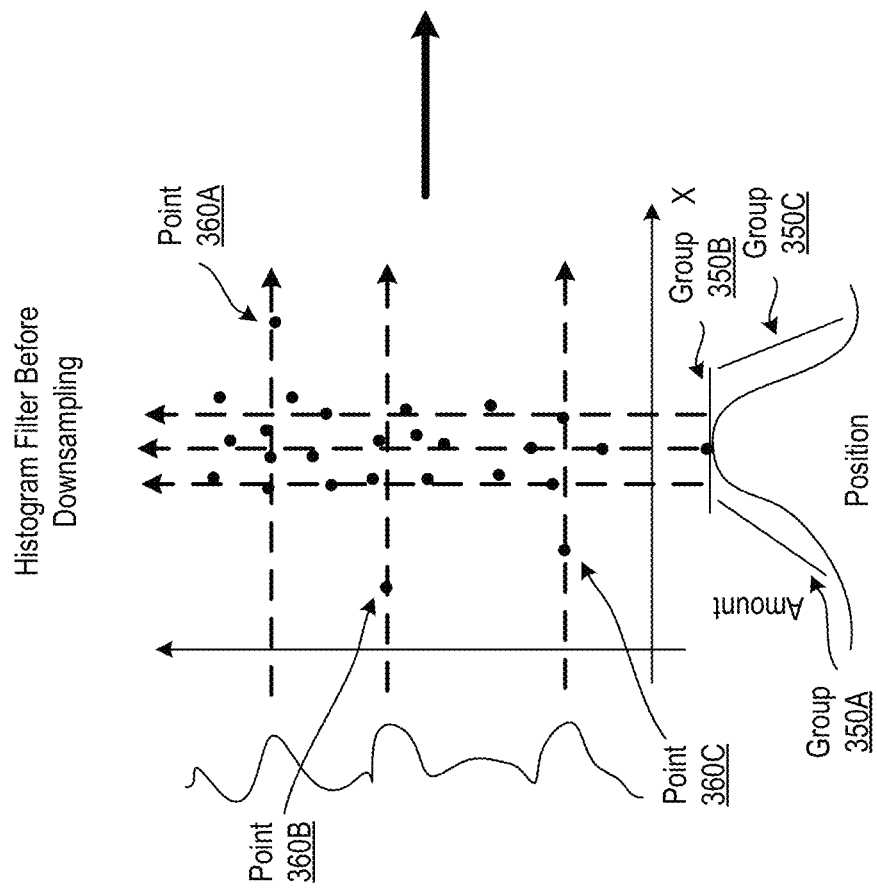

FIG. 3A is a flowchart of a process 300 for a histogram filter algorithm. FIGS. 3B-C are graphical depictions of the histogram filter during implementation. Specifically, FIG. 3B is a graphical depiction of the histogram filtering before down-sampling the point cloud. FIG. 3C is a graphical depiction of the histogram filtering after down-sampling. As described herein, the histogram filter is a noise reduction filter that can be used to delete points in the point cloud that likely are not part of a large, extended object. Thus, the histogram filter can be used to remove fuzz and random noise while leaving points that are found in objects and in features in the environment. Applying the histogram filter may not result in a significant reduction of a number of points in the point cloud.

The process 300 can be performed by any computing device, such as the computer system 104 (refer to FIG. 1A) and/or the point cloud filtering system 120 (refer to FIG. 1B). Histogram filtering is beneficial to down-sample point cloud data. In other words, the histogram filter is beneficial to remove noise and points from the point cloud that most likely are not associated with features/physical objects that a computer system is trying to identify. In some implementations the histogram filtering is separate from the slicing filtering (refer to FIGS. 5, 7, and 8A-B for discussion about the slicing filter). That is because the slicing filter can be applied to the point cloud after noise is removed with the histogram filtering techniques disclosed herein.

As an example, in a warehouse, the histogram filter can be applied to the point cloud to eliminate points that appear infrequently, and therefore are not indicative of a rack and/or vertical pole. The more points that populate a particular area in the point cloud, the more likely all those points should remain in the point cloud. The histogram filter does not add points. Then, as described throughout this disclosure, the k-means filter (refer to FIGS. 4A-B) can be applied to portions of the remaining point cloud where objects are located but there are not enough points indicative of such objects. The slicing filter (refer to FIGS. 7, 8A-B) can also be applied to portions of the remaining point cloud where objects are located but there are too many points populating an area representative of such objects. Using all the techniques described throughout this disclosure can result in generation of a refined point cloud that has a predetermined number and/or density of points, rather than having an overabundance and/or a scarcity of points that represent objects in the point cloud.

Referring back to FIG. 3A, first, the computer system selects an axis of the X, Y, and Z axes (step 302). As depicted in FIG. 3B, the X axis was chosen. Once the axis is chosen, points in the point cloud that are associated with the selected axis are isolated (step 304). As shown in FIG. 3B, a plurality of points that are isolated on the graph are associated with the X axis. Next, in step 306, the computer system generates sections/groupings for the points associated with the selected axis. Referring to FIG. 3B, three sections/groupings/clusters are generated: group 350A, group 350B, and group 350C. The group 350A is associated with any points appearing in a first ⅓ of the graph. The group 350B is associated with points in a second ⅓. The group 350C is associated with points in a third ⅓ of the graph. The groups 350A-C create an overall curve, which is depicted below the graph in FIG. 3B. As shown in FIG. 3B, a group with more points in the associated area of the graph has a higher peak in the overall curve than the other groups. Therefore, the group 350B, which is associated with the second ⅓ of the graph, has the highest peak because a largest amount/quantity of points (e.g., density) are located in the second ⅓ of the graph. If an area has more points, it is less likely those points should be removed from that area of the point cloud.

Referring back to FIG. 3A, once the sections (e.g., groups, clusters) are generated along the selected axis (step 306), one section can be selected in step 308. In the example of FIG. 3B, the group 350B can be selected. Then, the computer system determines a slope value for the selected section (step 310). In the example of FIG. 3B, the group 350B's slope most likely will be 0 or close to 0 since there are many points in that area of the graph, thereby creating the highest, flattest peak in the overall curve. Upon determining the slope, the computer system determines whether the magnitude of the slope is below a predetermined threshold value in step 312. A slope magnitude below the threshold indicates that the associated area on the graph has a high concentration/large amount of points that should not be removed from the point cloud. A slope magnitude above the threshold, on the other hand, indicates that the associated area on the graph has a low concentration/fewer amount of points that may be more closely associated with noise rather than a physical object, such as a vertical pole/rack in a warehouse.

In the example of FIG. 3B, the threshold value can be 1. As a result, since the slope of 350B is 0, the slope is below the threshold value. Consequently, the computer system, referring back to FIG. 3A, would designate points along that section (group 350B) for filtering (step 314). In other words, the points in the group 350B should not be removed. On the other hand, if the slope is greater than the threshold, the section/group has fewer, potentially scattered, points that more likely are noise. Whether the computer system determines the slope is greater than the threshold in step 312 or the points along the section/group are designated for filtering in step 314, the next step is to determine whether there are more sections/groups along the selected axis (step 316). If there are, then the computer system repeats steps 308-314 for the remaining sections/groups of the selected axis. In FIG. 3B, the computer system can identify slope values for the groups 350A and 350C (step 310). Regarding both groups 350A and 350C, the computer system may determine that the associated slope values are greater than the threshold value (step 312), thereby indicating that both groups 350A and 350C do not have many points, nor do they have points indicative of a physical object such as a vertical pole/rack. Consequently, the points in the groups 350A and 350C are not designated for filtering (step 314) and rather are indicative of noise to be removed.

Once steps 308-316 are completed for every section/group and there are no more sections/groups left, the computer system determines whether there are more axes (step 318). If there are, steps 302-318 are repeated for every axis identified. In the example of FIG. 3B, the computer system performs the steps 302-318 for the Y and Z axes. Once there are no more axes in step 318, the computer system identifies points that have been designated for all axes in step 320. Designated points are kept. So, in step 322, the computer system removes all points that were not identified/designated. In the example of FIGS. 3B and 3C, the computer system removes points 360A-C, all of which are associated with the groups 350A and 350C that had slope values above the threshold values. Thus, the histogram filter before downsampling graph in FIG. 3B demonstrates the point cloud scan before any points are removed. The histogram filter after down-sampling graph in FIG. 3C demonstrates the point cloud scan after points (e.g., the points 360A-C) are removed.

The histogram filter, process 300, is beneficial to remove points from the point cloud that do not belong or are not associated with popular groupings/sections. In the example of land surveying, points can be grouped based on height (steps 306-310). As a result, some buildings and/or trees that are above a certain height (a threshold value) may not belong in clusters or popular groups that have many points (step 312). Those buildings and/or trees above the threshold can be labeled as noise and removed from the point cloud (step 322). Buildings, on the other hand, that have a same height can be grouped together into a popular group/cluster and therefore designated as points to filter, especially if their height is below the threshold (step 312-314). In the example of land surveying, homes, buildings, parking lots, and/or roads that are at or near a same height or other value most likely will appear in popular groups/clusters and be retained for further filtering while physical objects such as trees and/or overpasses most likely will be outliers, labeled as noise, and therefore removed from the point cloud. As described throughout this disclosure, once noise is removed from the point cloud, remaining points can be further refined using k-means filtering and/or slicing techniques disclosed herein.

Figure 4A:
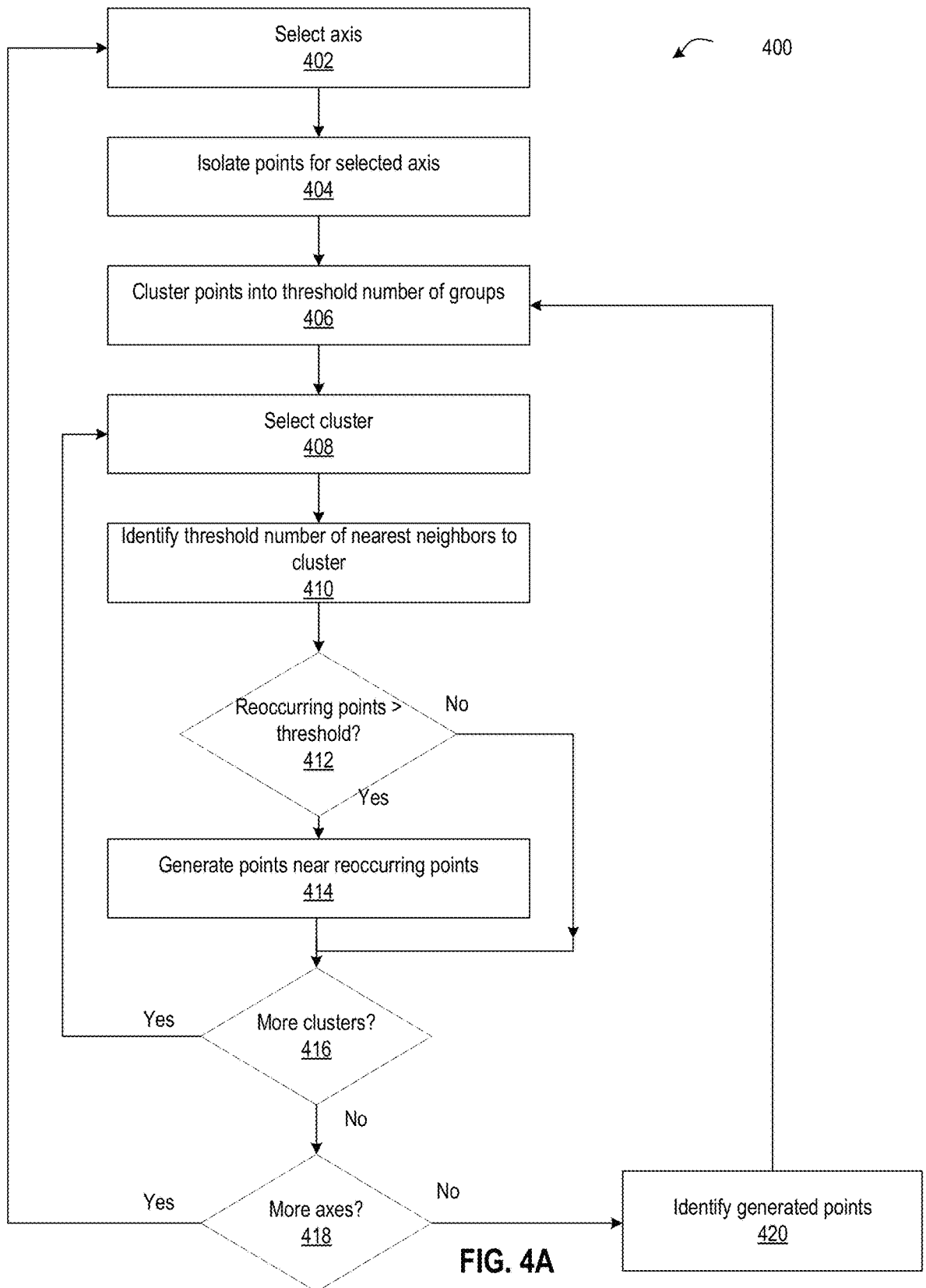
FIG. 4A is a flowchart of a process for a k-means filter algorithm.
Figure 4B:
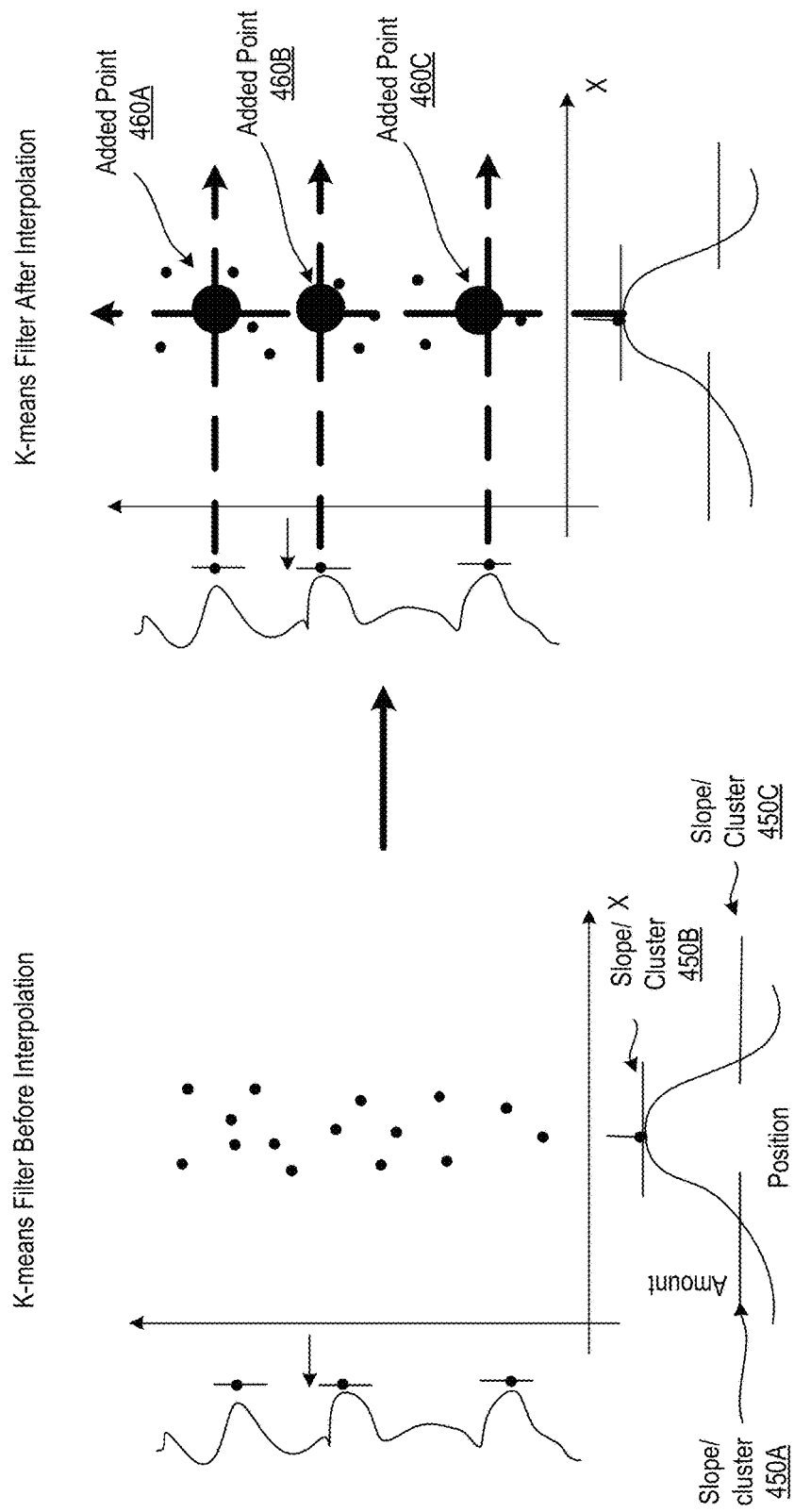
FIG. 4B is a graphical depiction of the k-means filter during implementation.

FIG. 4A is a flowchart of a process 400 of a k-means (e.g., k-guided) filter algorithm. FIG. 4B is a graphical depiction of the k-means filter during implementation. The k-means filter can be applied to the point cloud to enhance features or objects that are left alone after application of the histogram filter. Thus, the k-means filter can include generating points to enhance such features or objects. The process 400 can be performed by any computing device, such as the computer system 104 (refer to FIG. 1A) and/or the point cloud filtering system 120 (refer to FIG. 1B).

The k-means filter is beneficial to clean up a point cloud and add/interpolate points (e.g., up-sampling) in between existing points so that the point cloud can then be used for more accurate detection of physical items and mapping of the physical space. In some implementations, the k-means filter can be applied to the entire point cloud. In other implementations (e.g., refer to FIGS. 8A-B), the k-means filter can be applied to only portions of the point cloud. As mentioned throughout this disclosure, the k-means filter can be used in conjunction with the histogram filter described above (refer to FIGS. 3A-C) as well as the slicing filter (refer to FIGS. 7, 8A-B). In other implementations, the k-means filter may be the only filter used. As described, the k-means filter is a form of up-sampling and can implement k-means method to complete the filter's interpolation.

In the example implementation of land surveying, the k-means filter can be used to populate points that may be missing from an original 3D/Lidar scan(s). Thus, buildings, roads, houses, and/or other structures in the scan(s) can be made clearer by adding points where those points likely would be. Moreover, in any implementation, the k-means filter can have a parameter allowing a user and/or the computer system to determine how many points to add to a point cloud. For example, the parameter can require the point cloud to be populated with 10 million more points, where those 10 million new points are not placed over existing points in the scan(s). The 10 million points can be added around areas in the point cloud scan(s) that are most populated.

Referring to FIG. 4A, an axis is selected in step 402. A 1-dimensional projection of the selected axis is presented. As demonstrated in FIG. 4B, the X axis is selected. Next, the computer system isolates all points in the point cloud for the selected axis (step 404). The points are then clustered into a threshold number of groups in step 406, using the k-means mathematical method. The threshold number of groups can be determined by a user at a computing device, the computer system, and/or a device in communication with the computer system. In the example of FIG. 4B, the threshold number of groups/clusters is three. There are three clusters: cluster 450A is associated with the first ⅓ of the graph, cluster 450B is associated with a second ⅓, and cluster 450C is associated with a third ⅓. Moreover, as depicted in the first graph in FIG. 4B, three clusters are identified along the Y axis as well.

Next, in step 408, one cluster can be selected. The computer system then identifies a threshold number of nearest neighbors to the selected cluster (step 410). This threshold number can be determined by the user at the computer system and/or a device that is in communication with the computer system. In other implementations, the computer system can define a number of nearest neighbors to identify. Once the nearest neighbors are identified, the computer system determines whether a number of reoccurring points that are nearby neighbors is greater than a threshold value (step 412). A point can be deemed reoccurring in situations where the same point is located in the same position in the X, Y, and Z axes. In other words, the same point is generated over and over, indicating not only that it is reoccurring but also that it is popular and should remain in the point cloud. Points can then be interpolated around that reoccurring point in at least one of the X, Y, and Z axes.

Still referring to step 410, the threshold value can be associated with a number of best repeated points. For example, in a point cloud of 100 points, the 100 points can be clustered into 3 clusters, then 10 of the nearest neighbors to each of the 3 clusters can be identified. When looking at one cluster's 10 nearest neighbors, the computer system may require only 5 best, repeated, nearest neighbors (of the 10 nearest neighbors) to be kept. It is beneficial to not keep all the nearest neighbors because some might not be reoccurring, repeating, or close enough to indicate a vertical pole or some other identifiable physical object/item. Thus, points that overlap, are reoccurring, and/or are repeating are more likely indicative of a physical object/item to keep in the point cloud.

Referring back to step 412, if there are reoccurring points that are nearby neighbors and above the threshold, then the computer system generates (e.g., interpolates) points near those reoccurring points (step 414). Points are generated at/around clusters that are the most popular groupings. If the number of reoccurring points that are nearby neighbors is not above the threshold in step 412, then the points are too spread out to be a physical item/object, and the computer system will not add/interpolate points but rather will determine whether there are more clusters to investigate (step 416). If there are more clusters, the computer system returns to step 408 and repeats the steps until there are no more clusters for the selected axis. Once there are no more clusters, the computer system determines whether there are more axes in step 418. If there are, the computer system returns to step 402 and repeats the steps previously discussed. Once there are no more axes, the computer system identifies the generated points from step 414 (step 420). The identified generated points can be clustered into a threshold number of groups in step 406 and steps 406-420 can be repeated until all points are interpolated and/or analyzed.

As demonstrated in FIG. 4B, each of the points pulled out of the graph and placed outside the X and Y axes represent center groupings per cluster. Cluster 450B has a highest peak on a curve depicted below the X axis since most of the points in this point cloud are concentrated in the second ⅓ of the graph. In other words, the second ⅓ of the graph, cluster 450B, has the most reoccurring points and therefore is more likely indicative of a vertical pole in a warehouse environment or another physical item/object. Cluster 450B is a popular grouping and a part of the point cloud where points can be interpolated (see added points 460A-C in FIG. 4B k-means filter after interpolation graph). Then, as mentioned in reference to FIG. 4A, the process of interpolation via the k-means filter can be repeated for every point added to the second ⅓ of the graph for the X axis.

Figure 5:
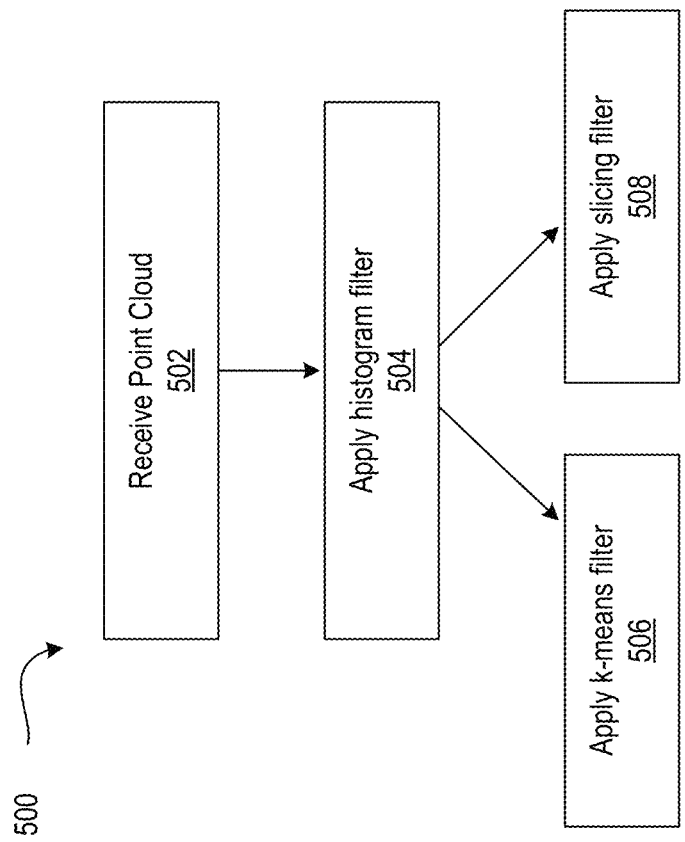
FIG. 5 is a flowchart of a process for filtering the point cloud.

FIG. 5 is a flowchart of a process 500 for filtering the point cloud. The process 500 can be performed by any computing device, such as the computer system 104 (refer to FIG. 1A) and/or the point cloud filtering system 120 (refer to FIG. 1B). First, the computer system can receive a point cloud in step 502 (refer to FIGS. 1A-B). Next, the computer system can apply a histogram filter in step 504, as described throughout this disclosure (refer to FIGS. 3A-C). As mentioned, the purpose of step 504 is to clean up the point cloud by removing excess/outlier points that do not make up one or more objects/items of interest in the point cloud. Using the described histogram filtering techniques can make application of additional refinement filters, such as a k-means filter and/or slicing filter, more accurate and beneficial for identification of objects/items within the point cloud. In some implementations, step 504 may not be performed. In other implementations, step 504 may be performed simultaneously or after any one of the k-means filter and the slicing filter.

In step 506, the k-means filter can be applied to up-sample portions of the point cloud (refer to FIGS. 4A-B). In step 508, the slicing filter can be applied to down-sample portions of the point cloud (refer to FIGS. 7, 8A-B). In some implementations, the k-means filter and the slicing filter can be simultaneously applied to the point cloud. The k-means filter can be applied to particular portions of the point cloud while the slicing filter can be applied to other portions of the point cloud (refer to FIGS. 8A-B). In other implementations, only one of the k-means filter and slicing filter may be applied to the point cloud. The computer system can determine which filter should be applied to the point cloud based on a statistical distribution analysis, as described herein (refer to FIGS. 6-7).

Figure 6A:
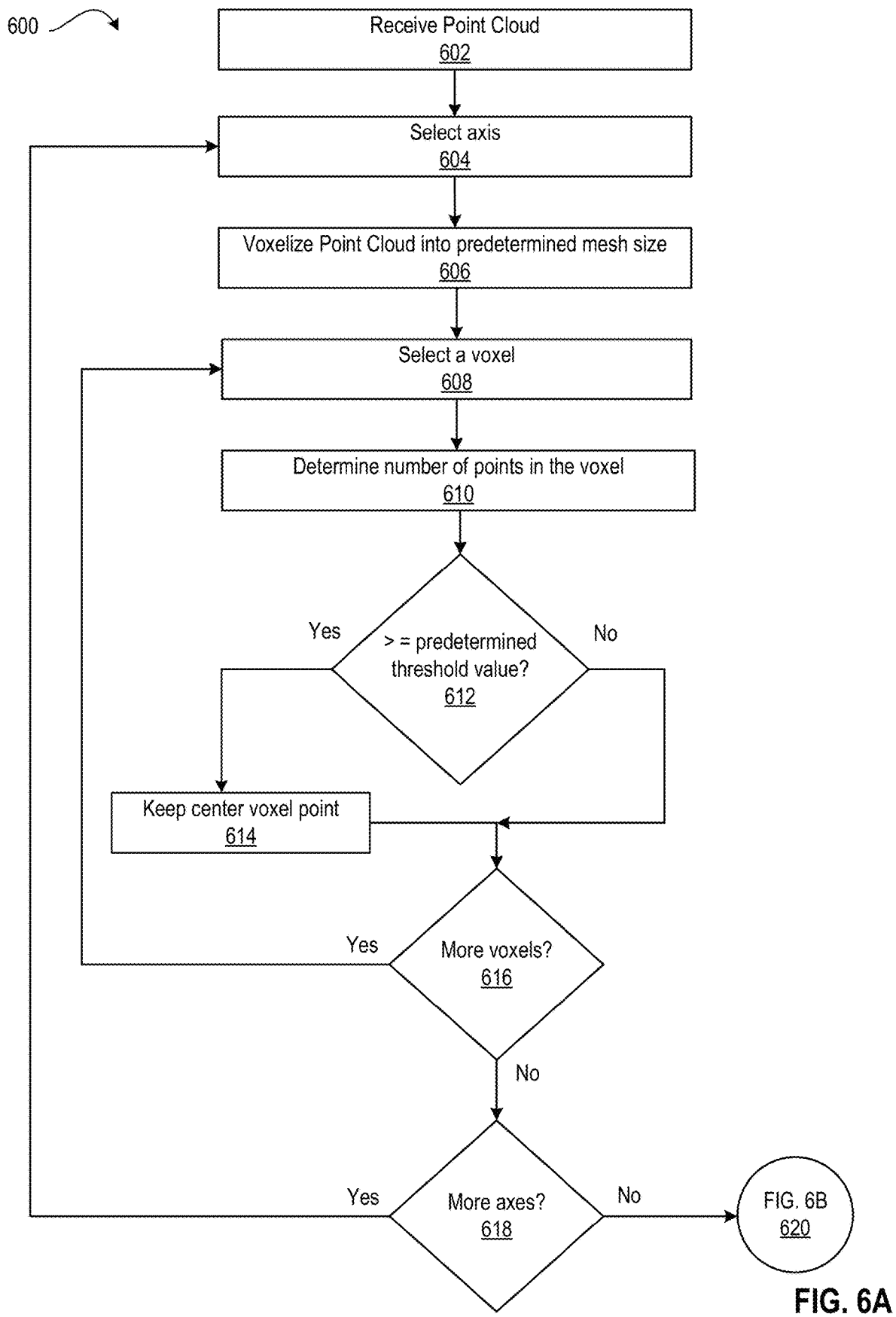
FIGS. 6A-B is a flowchart of a process for analyzing voxels of points within the point cloud.
Figure 6B:
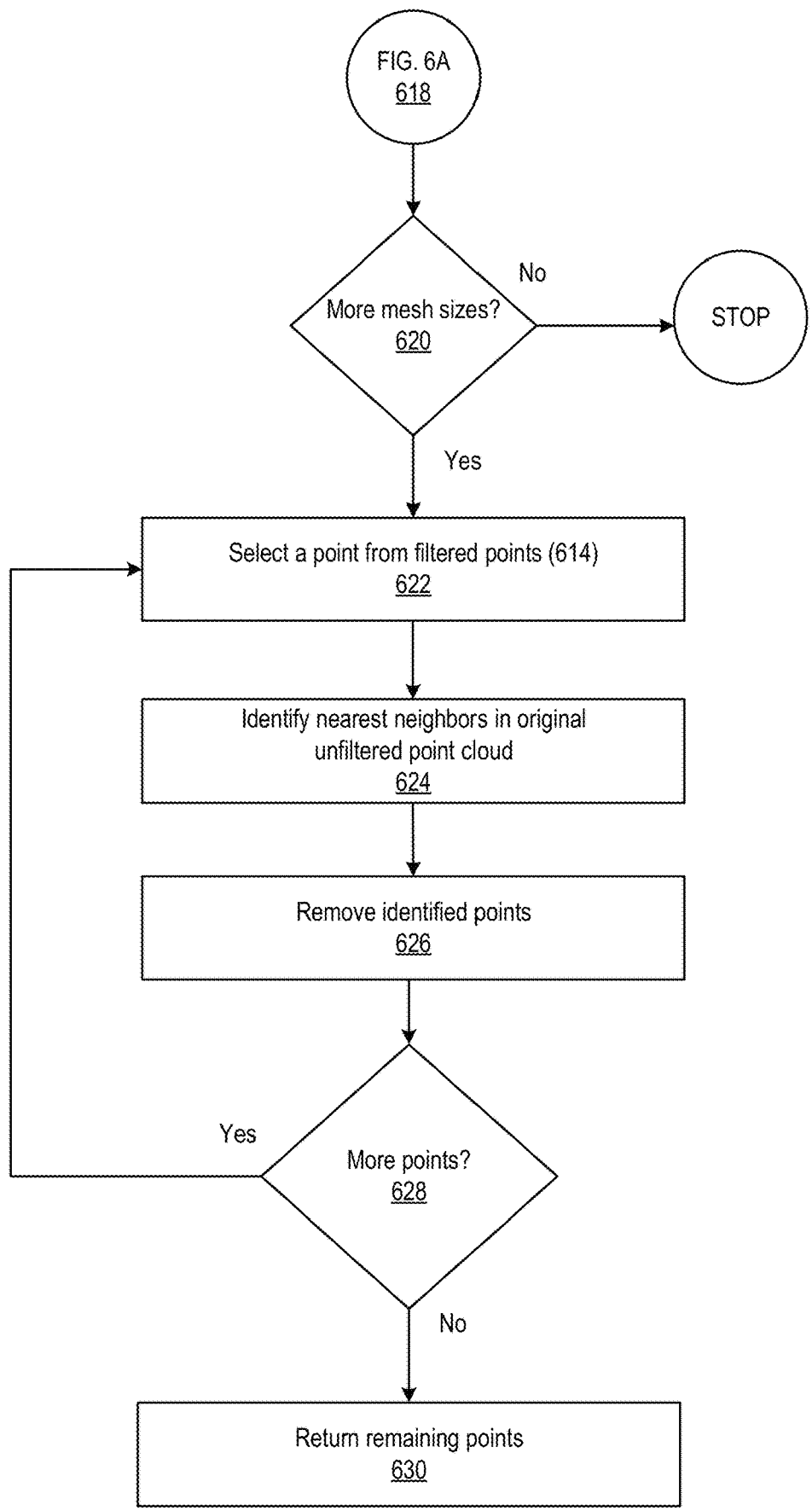

FIGS. 6A-B is a flowchart of a process 600 for analyzing voxels (e.g., groups, clusters) of points within the point cloud. The process 600 can be performed by any computing device, such as the computer system 104 (refer to FIG. 1A) and/or the point cloud filtering system 120 (refer to FIG. 1B). The process 600 can be a form of histogram filtering (refer to FIG. 5 step 504) that is implemented to remove noise and analyze point density within the point cloud. In some implementations, the process 600 can be performed in conjunction with the process 300 (refer to FIGS. 3A-C). In other implementations, the process 600 can be performed instead of the process 300. In yet other implementations, the process 600 and process 300 can be combined into one technique performed by the computer system to reduce redundancy and increase efficiency in analyzing and refining the point cloud.

In order for the computer system to determine whether to apply the k-means filter and/or the slicing filter, the computer system must analyze a density of points in the point cloud. Analyzing point density can be accomplished with a statistical distribution analysis of the density of voxels of points within the point cloud (refer to FIG. 7). The statistical distribution analysis is performed on voxels having a sufficient number of points that are sufficiently distanced from each other and a center of the voxels. The statistical distribution analysis is not performed on voxels having few points that are too spread out because such points are more likely outliers or not indicative of an object/item within the point cloud. Before the statistical distribution analysis can be performed, the computer system must determine which voxels of points to keep in the point cloud, as described in reference to the process 600.

Referring to the process 600 in both FIGS. 6A-B, first, the computer system receives the point cloud in step 602. In some implementations, the computer system can receive the point cloud after the histogram filtering process 300, described in reference to FIGS. 3A-C, is been applied. In other implementations, the computer system can receive the point cloud that has not yet been refined using any of the techniques disclosed herein. Next, the computer system selects an axis in step 604. In this step, entire sections/groupings of points are compressed into 2D histograms. Once the axis is selected, the computer system voxelizes the resulting point cloud into predetermined mesh size(s) (step 606). In some implementations, the mesh size(s) can be determined by the computer system. The computer system can make such a determination based at least in part on a number of points in the point cloud, a size of the point cloud, and/or other characteristics of the point cloud using predictive analytics. In other implementations, the computer system can receive from a user at a user input device mesh size(s) that is determined by the user.

Moreover, in some implementations, step 606 can be repeated a predetermined number of times based on how many different mesh size(s) are determined and applied to the point cloud. Repeating the process 600 with different mesh sizes can result in more accurate refinement of the point cloud. This is because different mesh sizes can be used to identify or detect different sized/shaped objects/items within a physical space. For example, a smaller mesh size can be used for detecting whether points in the point cloud represent a house while a larger mesh size can be used for detecting whether points in the point cloud represent a large commercial building.

Still referring to FIGS. 6A-B, the computer system selects a voxel in step 608. The computer system then determines a number of points within the voxel in step 610.

In step 612, the computer system can determine whether the number of points in the voxel is greater than or equal to a predetermined threshold value. If the number of points is greater than or equal to the predetermined threshold value, the computer system can keep a center voxel point in step 614. If the number of points is less than the predetermined threshold value, then the computer system can determine whether there are more voxels in step 616.

If there are more voxels, the computer system can return to step 608 and repeat the steps described above. If there are no more voxels, the computer system can determine whether there are more axes (step 618). If there are more axes, the computer system can return to step 604 and repeat the steps 604-618 until there are no more axes to analyze. In some implementations, the computer system can repeat step 606 by iteratively incrementing the predetermined mesh size. The mesh size can be incremented with every pass through steps 604-624 per axis. In other implementations, the mesh size can be incremented a predetermined number of times per a particular axis. Iteratively incrementing the mesh size is advantageous to ensure the computer system retains points that identify objects/items within the point cloud, as previously discussed. Iteratively incrementing the mesh size is also advantageous to ensure that the computer system does not erroneously remove points that are in fact pertinent to identifying objects/items of interest within the point cloud.

If there are no more axes, then the computer system can proceed to step 620. In step 620, the computer system can determine whether there are more mesh sizes. At this point, the computer system can perform steps to down-sample the point cloud y a tuned threshold. In other words, if a point passes a voxel size threshold, that point can be used for removing its nearest neighbors from the original point cloud. The new down-sampled point cloud can be used if additional mesh sizes for a slicing filter are needed. Therefore, if there are no more mesh sizes in 620, the process 600 can stop.

In step 622, a point can be selected from amongst the filtered points (e.g., refer to step 614). Nearest neighbors of the selected point can be identified in the original, unfiltered point cloud (step 624). The identified points can be removed in step 626. Such points can be removed in order to remove features from the point cloud that have already been captured by previous executions of the slicing filter and techniques described herein. For example, each iteration of the slicing filter can be tuned to identify one or more specific features. When one or more specific features are identified, such features can be removed from the point cloud so that a next, potentially less dense, feature can be identified.

In step 628, the computer system can determine whether there are more points to select from amongst the filtered points. If there are more points, the computer system can return to the step 622 and repeat the steps 622-628. Repeating the steps 622-628 can be beneficial to identify and extract specific features within the point cloud. With each pass of the steps 622-628, additional features may be extracted from the point cloud and/or features may become more apparent. Moreover, a number of points that are used to identify the specific features can be reduced or refined so that an excess number of points do not populate the point cloud. All of the points that have been filtered using the previously described slicing filter can be used as nearest neighbor calculation points in the steps 622-628

Once there are no more points to analyze, the computer system can return remaining points in 630. The remaining points can make up a sub-sampled point cloud.

Figure 7:
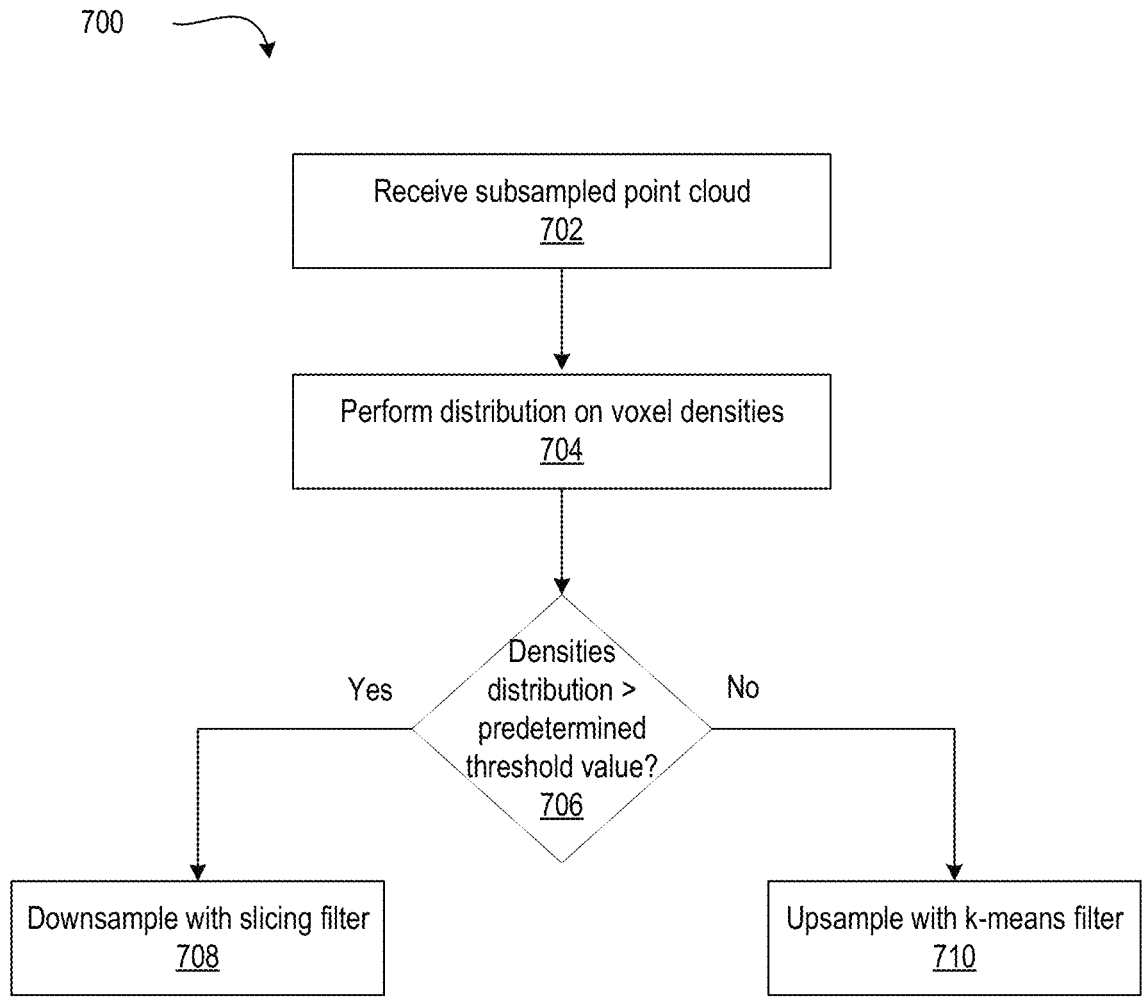
FIG. 7 is a flowchart of a process for analyzing density distribution within the point cloud.
Figure 8:
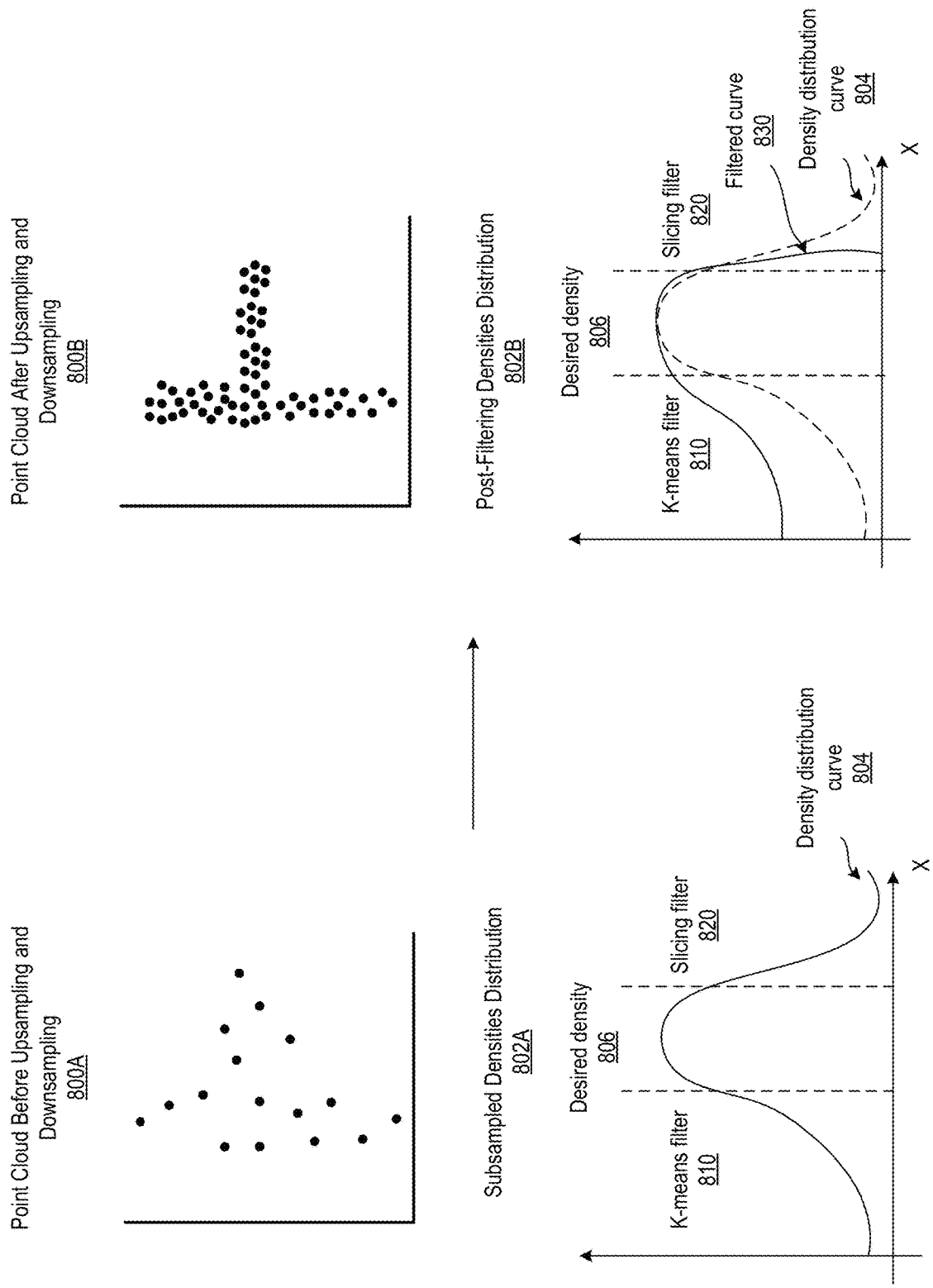
FIGS. 8A-B are graphical depictions of analyzing density distribution within the point cloud.

FIG. 7 is a flowchart of a process 700 for analyzing density distribution within the point cloud. The process 700 can be performed by any computing device, such as the computer system 104 (refer to FIG. 1A) and/or the point cloud filtering system 120 (refer to FIG. 1B). The process 700 is beneficial for the computer system to determine whether to apply the k-means filter and/or the slicing filter in order to up-sample and/or down-sample points in the point cloud, as described throughout this disclosure.

First, in step 702, the computer system receives the subsampled point cloud (refer to FIGS. 6A-B). This point cloud has been refined using histogram filtering techniques described throughout this disclosure. Thus, noise (e.g., scarce/outlier points) has been removed and only points pertaining to objects/items of identification within the point cloud remain.

In step 704, the computer system performs statistical distribution analysis on the voxel densities (e.g., refer to the process 600 in FIGS. 6A-B). Performing statistical distribution analysis on the voxel densities results in creation of a graph (refer to FIGS. 8A-B), wherein the Y axis of the graph represents density of points and the X axis represents quantity of voxels having that density. Moreover, a direction of an axis that is being looked at can change which axis is being used for density and which axis is being used for voxels. Thus, the graph axes can be determined relative to a user's point of view. After performing the statistical distribution analysis, the computer system determines whether the resulting distribution of densities is greater than a predetermined threshold value in step 706. The threshold value can be predetermined by the computer system and/or a user input, as described throughout this disclosure. In other implementations, the threshold value can be determined at a time of performing statistical distribution. For example, results of the statistical distribution can be analyzed in order to identify an optimal, minimal level of density in the particular point cloud. As depicted in FIGS. 8A-B, a flat upper portion of a bell curve (e.g., desired density 806) can be indicative of the optimal, minimal level of density for the point cloud. Thus, the flat, upper portion of the bell curve can be identified as the threshold density value. That threshold value can then be used to determine what portions of the curve (e.g., point cloud) require up-sampling and/or down-sampling in order to achieve a uniform minimal level of density.

Still referring to FIG. 7, if the distribution of densities is greater than the predetermined threshold value, then portions of the point cloud where the distribution is greater can be down-sampled with the slicing filter (step 708). In other words, portions of the point cloud having too many points, or a number of points exceeding that required for the identified optimal, minimal level of density, can be further refined by removing points and/or condensing the points within those portions of the point cloud. If, on the other hand, the distribution of densities is less than the predetermined threshold value, then portions of the point cloud where the distribution is less can be up-sampled with the k-means filter (step 710). In other words, portions of the point cloud having too few points, or a number of points not equal to that required for the identified optimal, minimal level of density, can be further refined by adding points to fill in gaps within those portions of the point cloud.

FIGS. 8A-B are graphical depictions of analyzing density distribution within the point cloud. FIG. 8A depicts the point cloud 800A before up-sampling and down-sampling as well as the point cloud 800A's associated subsampled densities distribution graph 802A. As depicted in the point cloud 800A, points are scarcely distributed along the X and Y axes. This scarce distribution of points is further depicted in the graph 802A's density distribution curve 804. An X axis of the graph 802A represents a quantity of voxels having each of the determined voxel densities. A Y axis of the graph 802A represents density values.

In the graph 802A, a desired density 806 is the predetermined threshold value discussed in reference to FIG. 7 step 706. The desired density 806 is at the peak of the density distribution curve 804 because the desired density 806 is indicative of an optimal, minimal number of points (e.g., point density) within the point cloud 800A. The desired density 806 represents a removal of high density areas of the point cloud 800A, thereby helping to uniform the points of the point cloud 800A. As depicted, k-means filtering up-samples low density areas (refer to 810) and slicing filtering down-samples high density areas (refer to 820) to generate fitted curve 830 (refer to FIG. 8B). Applying these filters can move points in the point cloud 800A into some density that allows for the point cloud 800A to become more uniform.

Portions of the curve 804 to the left of the desired density 806 are indicative of portions of the point cloud 800A wherein points are scarcely distributed (e.g., less densely populated). In such portions, k-means filter 810 is applied to up-sample. Portions of the curve 804 to the right of the desired density 806 are indicative of portions of the point cloud 800A wherein points are heavily distributed (e.g., more densely populated). In such portions, slicing filter 820 is applied to down-sample.

Now referring to FIG. 8B, FIG. 8B depicts point cloud after up-sampling and down-sampling 800B and its corresponding post-filtering densities distribution graph 802B. The graph 802B includes a filtered curve 830 represented as a solid line and the original density distribution curve 804 represented as a dotted line. Applying the k-means filter 810 to the portion of the curve 804 left of the desired density 806 resulted in up-sampling that portion of the curve 804 (e.g., adding points), as depicted in the filtered curve 830. Consequently, the left portion of the curve 830 has a density closer to that of the desired density 806 (e.g., graphically, the left portion of the curve 830 is raised). Applying the slicing filter 820 to the portion of the curve 804 right of the desired density 806 resulted in down-sampling that portion of the curve 804 (e.g., removing points), as depicted in the filtered curve 830. Consequently, the right portion of the curve 830 has a density less than that of the desired density 806 (e.g., graphically, the right portion of the curve 830 is lowered).

High density areas can throw off the k-means filter 810 since too many points can be chosen in too small of an area. Thus, it can be desired to up-sample small density areas and down-sample large density areas of the point cloud. Low and high density areas can be detected based on errors of the k-means filter, distances of centroid points to points within group sets of the centroid points, and whether there is a lack or an abundance of points within the group sets of the centroid points. Consequently, more points can be created when the points are needed and less points can be created when they are not needed in certain areas of the point cloud. Moreover, points may not be added to edges of the point cloud since a group of points may not go past a particular distance that indicates an edge (refer to FIG. 11).

Finally, the point cloud after up-sampling and down-sampling 800B depicts a more refined point cloud in which points have been added, removed, and condensed together to generate a cleaner version of the point cloud than the point cloud depicted in 800A.

Figure 9:
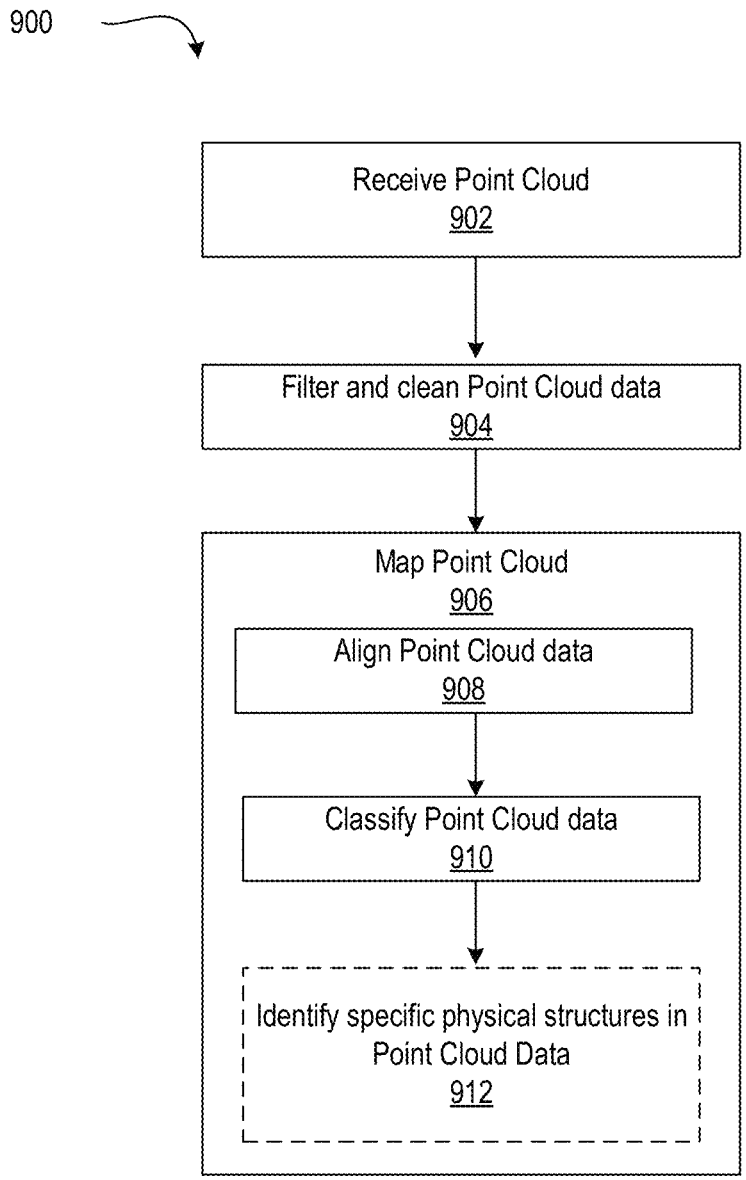
FIG. 9 is a flowchart of a process for processing the point cloud.

FIG. 9 is a high-level flowchart of a process 900 for processing a point cloud. The process 900 can be performed by any computing device, such as the computer system 104 (refer to FIG. 1A), the point cloud filtering system 120, and/or the point cloud mapping system 170 (refer to FIG. 1B). In some implementations, some of the steps (e.g., step 904) can be performed by the point cloud filtering system 120, as depicted and described throughout this disclosure (refer to FIG. 1B). In some implementations, some of the steps (e.g., steps 906-912) can be performed by the point cloud mapping system 170, as described in reference to FIG. 1B. In yet other implementations, the process 900 can be performed by one computer system.

In an exemplary warehouse environment, a point cloud can be used to map the warehouse environment. As a result, identifying objects in the warehouse, such as vertical poles used for racks, can be helpful to determine a layout of the warehouse. First, the computer system receives a point cloud in step 902. As previously mentioned (refer to FIGS. 1A-B), the computer system can receive the point cloud from a drone that takes 3D scans of a physical environment. In a warehouse, a new point cloud scan includes at least one of walls, floor, ceiling, racks, pallets, doors, light fixtures, vertical support poles, humans, forklifts, noise, random variations, occlusions, etc. In, for example, an outdoor space, a new point cloud scan can include at least one of trees, shrubs, buildings, homes, parking lots, people, highways, overpasses, bridges, lakes, rivers, etc. The new point cloud scan is aligned randomly in space and often a floor of the physical environment is nearly parallel to the XY-plane. Typically, the point cloud scan includes noise, which can include several points from physical objects in other nearby locations and/or rooms. As a result, this noise increases a bounding box of the physical environment beyond just the walls or other existing perimeter.

Next, the computer system refines and/or filters (e.g., cleans) the point cloud (step 904), as described throughout this disclosure (refer to FIGS. 2-8). The computer system uses several filters, such as guided filters (e.g., k-means filter, slicing filter), that can reduce a variation of point positions. Guided filters can make surfaces cleaner, make edges sharper, and remove outlier noise. Using this type of filter as a first step can improve accuracy of all point cloud processes discussed in reference to FIG. 9. Exemplary filters used by the computer system include a histogram filter (discussed in more detail in FIGS. 3A-3B) and a k-means filter (discussed in more detail in FIGS. 4A-4B). Alternatively, if a guided filter is not used in the filtering and cleaning point cloud data step (904), then an outlier filter can be used to remove some noise in the point cloud scan. For each noise detection, a confidence score/value associated with identified physical objects is decreased accordingly.

The computer system can then map the point cloud in step 906. Mapping the point cloud can include aligning point cloud data in step 908, classifying the point cloud data in step 910, and optionally identifying specific physical structures in the point cloud data in step 912. In step 908, the point cloud data can be aligned to X, Y, and Z axes. In other words, the point cloud is rotated and oriented in a proper direction. For example, a warehouse room scan can be received (step 902) in an arbitrary space, not aligned with any of the axes. The scan can then be rotated and aligned to a proper space of the warehouse. In some examples, the point cloud can be lined up with a width of a wall in the warehouse in order to determine the point cloud's proper orientation. The computer system can look for reference points around doorways, doorframes, windows, and/or other objects that may appear in the point cloud to orient the point cloud appropriately. In yet other examples, the computer system can detect a bounding box of the physical space (e.g., the warehouse room) that hugs walls of the physical space and then rotate the physical space such that the bounding box is aligned with X, Y, and Z axes. A tight-fitting bounding box can also be used to more easily identify noise points outside of the walls of the physical space. Performing this alignment step is important because it decreases the amount of time it takes to make certain computations later in the point cloud processing.

Once the point cloud data undergoes alignment and initial cleaning, object detection and localization can begin (step 910). A spherical filter can be used in this step to classify the point cloud data. In this step, physical objects, perimeters, and other items appearing in the point cloud can be identified, classified, and scored. In some implementations, some identified, classified, and scored items can be removed from the point cloud. For example, floors and ceilings can be eliminated. Points that are not likely to be vertical poles in the warehouse environment can also be eliminated.

Based on the purpose and use of the point cloud, different physical objects can be identified for elimination and/or keeping. For example, in land surveying, the computer system may be configured to identify and eliminate trees and shrubs. The computer system may further be configured to identify buildings and parking lots and keep those in the point cloud. Often, the easiest thing to detect in the point cloud scan is the floor or some other horizontal plane. For example, in the warehouse environment where rack detection may be most important, points that are likely to be part of the floor can be identified and removed from the point cloud. In most implementations, the ceiling is also relatively easy to detect, as are light fixtures, beams, evaporative coils, and other objects that may hang from the ceiling. Walls may be more challenging to detect, but using classifiers, vertical poles and other physical item confidence scores can be adjusted accordingly such that walls, ceilings, etc. are removed from the point cloud.

Next, the computer system can optionally identify specific physical structures in the remaining point cloud data (step 912). For example, vertical poles, racks, and/or aisles in the warehouse can be identified and assigned confidence scores. In the land surveying example, the system can identify homes, buildings, parking lots, and/or roads. As a result, such identifications can be used to generate an accurate blueprint and/or map of the associated physical space.

Figure 10C:
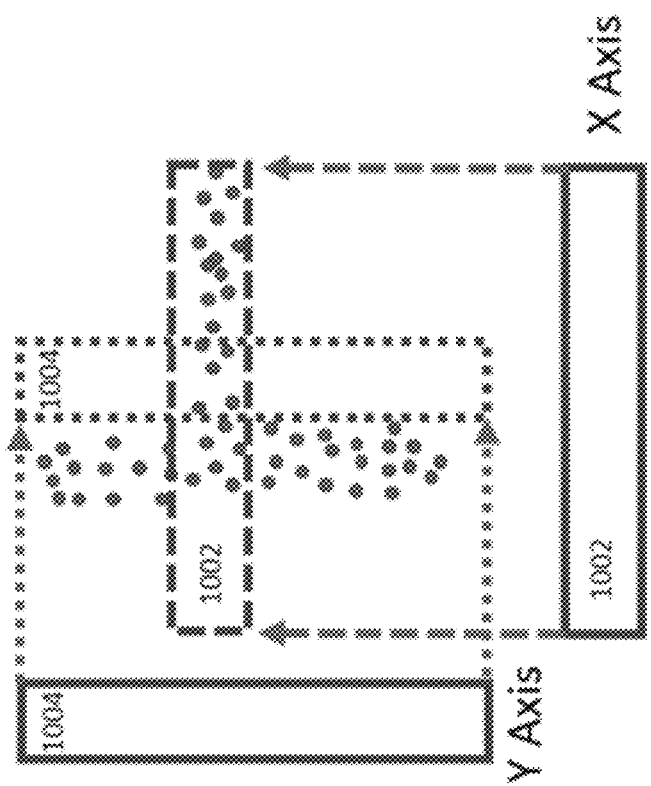
Figure 10B:
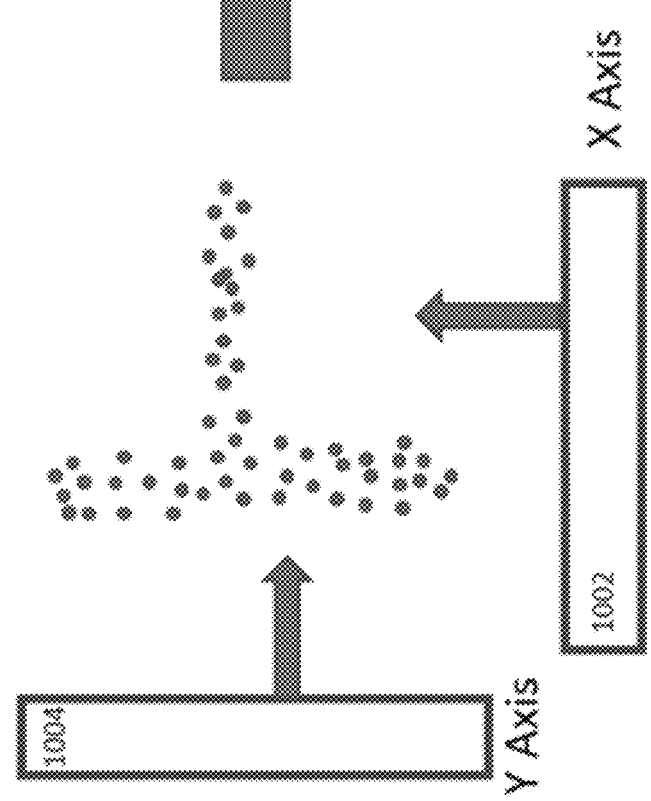
Figure 10E:
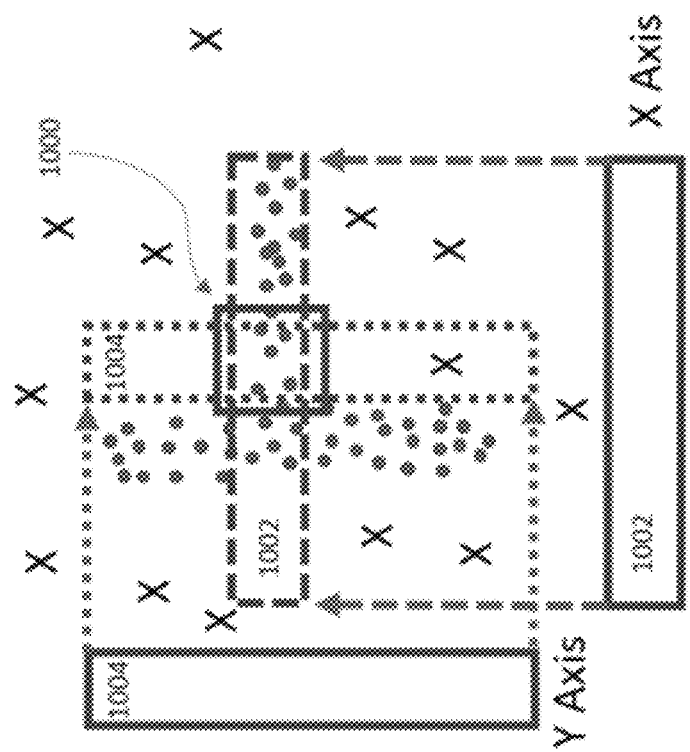
Figure 10D:
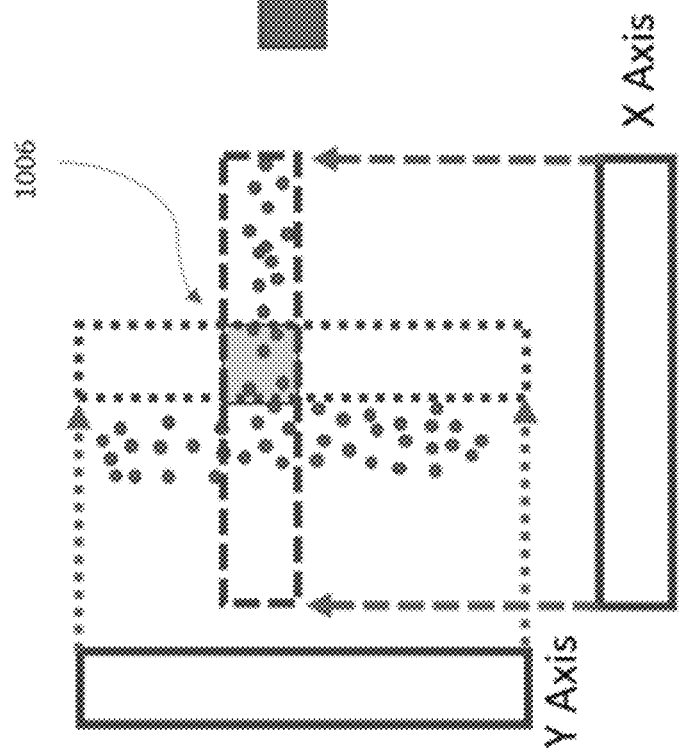

FIGS. 10A-E are exemplary depictions of voxelizing the point cloud. FIG. 10A depicts a voxel 1000 of the point cloud in three dimensional ("3D") space. Points that make up the point cloud can be located within the voxel 1000. Moreover, the voxel 1000 can be further voxelized into different mesh sizes. Voxelizing the voxel 1000 can provide for more accurate identification of physical structures from the point cloud data. Although the process and techniques of voxelizing the point cloud occurs in 3D space, FIGS. 10B-E depict generating the voxel 1000 in two dimensional ("2D") space for illustrative purposes. As depicted in FIGS. 10B and 10C, slices 1002 and 1004 of the point cloud can be selected along x and y axes (as mentioned, a slice of the point cloud can also be selected along the z axes in 3D space). Next, FIG. 10D depicts a bounded area 1006, which includes selected points along x, y, and z axes. A volume of the bounded area 1006 can be determined. This bounded area 1006 in 3D space creates a voxel or cube (e.g., the voxel 1000 in FIG. 10A) that can then be analyzed using the techniques described throughout this disclosure. FIG. 10E depicts analysis of points outside of the voxel 1000. As described in reference to FIG. 6A, a center point of the voxel 1000 can be identified. Then, distances between points and the center point can be determined. Points that are above a predetermined distance from the center point can be removed from the point cloud. These points are marked by an "X" in FIG. 10E. The points that are removed from the point cloud can be indicative of noise. If a sufficient number of points remain within the voxel, then those remaining points can be further analyzed to determine relationships amongst the points, for example, whether they are indicative of a physical structure in a physical space and whether up-sampling and/or down-sampling of points in the voxel is needed, as described throughout this disclosure. The process described herein can be repeated a predetermined number of times and/or with different voxel mesh sizes.

Figure 11:
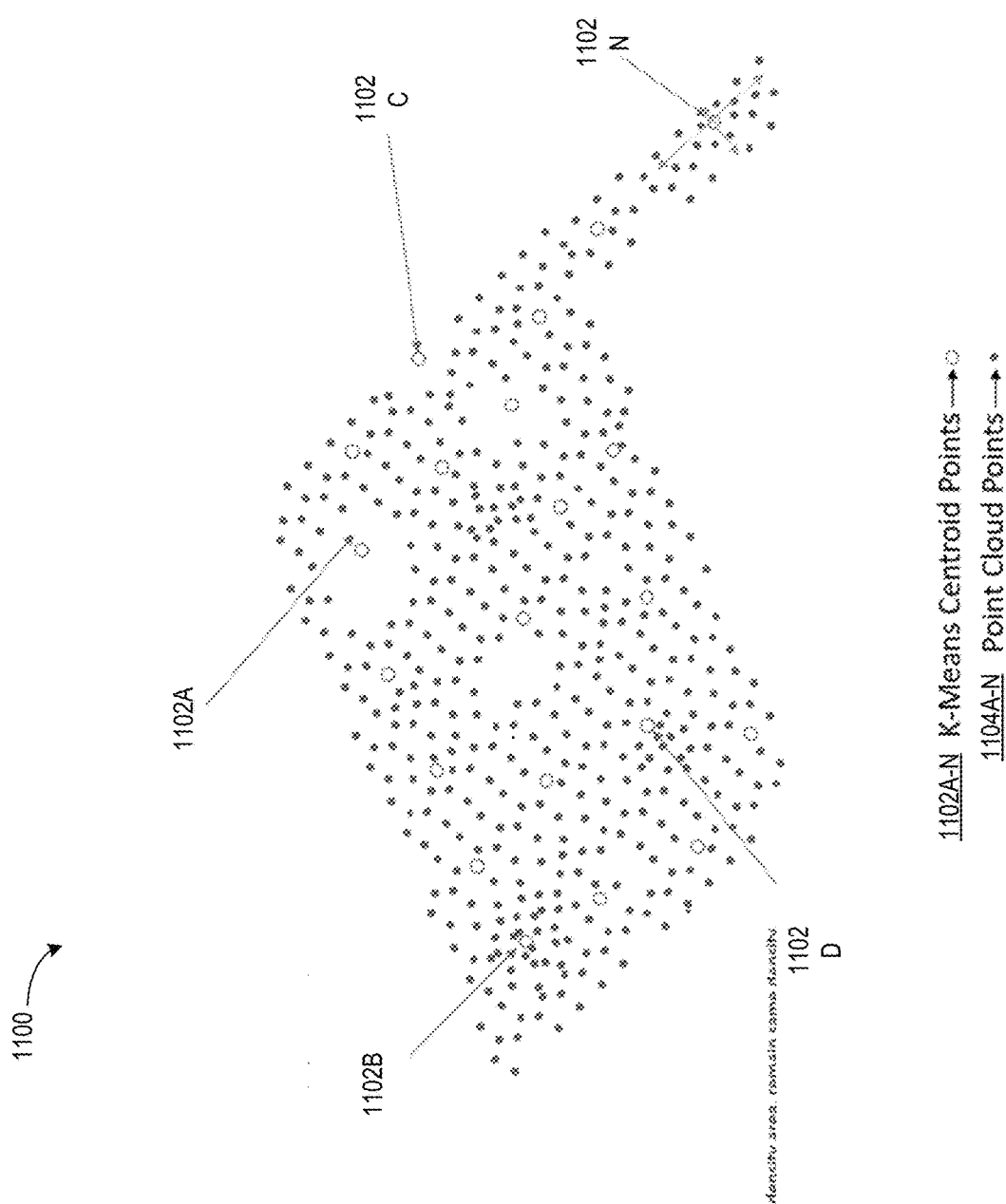
FIG. 11 depicts example point cloud data with k-means centroid points.

FIG. 11 depicts example point cloud data with k-means centroid points. As shown, a point cloud 1100 can include k-means centroid points 1102A-N and point cloud points 1104A-N. K-means centroid point 1102A is located in a low density area of the point cloud 1100. Thus, the k-means centroid point 1102A needs up-sampling. There are larger distances in all directions from the point 1102A to surrounding point cloud points 1104A-N. Thus, the larger distances in all directions can be filled in with new points.

K-means centroid point 1102B is located in a high density area of the point cloud 1100. Thus, the k-means centroid point 1102B needs down-sampling. There are small distances in all directions from the point 1102B to surrounding point cloud points 1104A-N. The density of points 1104A-N can therefore be thinned out during down-sampling.

Moreover, k-means centroid point 1102C is located in a low density area of the point cloud 1100. Up-sampling is therefore needed. There are larger distances in some, but not all, directions from the point 1102C to surrounding point cloud points 1104A-N. Therefore, the large distances in some of the directions can be filled in with points such that some of the gaps remain between the k-means centroid point 1102C and the nearby point cloud points 1104A-N.

K-means centroid point 1102D is located in an average density area of the point cloud 1100. Therefore, neither up-sampling nor down-sampling can be required. The density of the point cloud 1100 can remain as-is. After all, there can be average distances in all directions between the k-means centroid point 1102D and surrounding point cloud points 1104A-N. It can be preferred to keep points 1104A-N as they appear so that they do not exceed past the average distances from the k-means centroid point 1102D.

Finally, k-means centroid point 1102N is also located in an average density area of the point cloud 1100. Neither up-sampling nor down-sampling can be required. There can be longer distances in one direction and shorter or smaller distances in a second direction. Even so, the point cloud points 1104A-N can remain within the longer and shorter distances to the k-means centroid point 1102N such that they do not exceed those distances.

The computing devices described in this document that may be used to implement the systems, techniques, machines, and/or apparatuses can operate as clients and/or servers, and can include one or more of a variety of appropriate computing devices, such as laptops, desktops, workstations, servers, blade servers, mainframes, mobile computing devices (e.g., PDAs, cellular telephones, smartphones, and/or other similar computing devices), computer storage devices (e.g., Universal Serial Bus (USB) flash drives, RFID storage devices, solid state hard drives, hard-disc storage devices), and/or other similar computing devices. For example, USB flash drives may store operating systems and other applications, and can include input/output components, such as wireless transmitters and/or USB connectors that may be inserted into a USB port of another computing device.

Such computing devices may include one or more of the following components: processors, memory (e.g., random access memory (RAM) and/or other forms of volatile memory), storage devices (e.g., solid-state hard drive, hard disc drive, and/or other forms of non-volatile memory), high-speed interfaces connecting various components to each other (e.g., connecting one or more processors to memory and/or to high-speed expansion ports), and/or low speed interfaces connecting various components to each other (e.g., connecting one or more processors to a low speed bus and/or storage devices). Such components can be interconnected using various busses, and may be mounted across one or more motherboards that are communicatively connected to each other, or in other appropriate manners. In some implementations, computing devices can include pluralities of the components listed above, including a plurality of processors, a plurality of memories, a plurality of types of memories, a plurality of storage devices, and/or a plurality of buses. A plurality of computing devices can be connected to each other and can coordinate at least a portion of their computing resources to perform one or more operations, such as providing a multi-processor computer system, a computer server system, and/or a cloud-based computer system.

Processors can process instructions for execution within computing devices, including instructions stored in memory and/or on storage devices. Such processing of instructions can cause various operations to be performed, including causing visual, audible, and/or haptic information to be output by one or more input/output devices, such as a display that is configured to output graphical information, such as a graphical user interface (GUI). Processors can be implemented as a chipset of chips that include separate and/or multiple analog and digital processors. Processors may be implemented using any of a number of architectures, such as a CISC (Complex Instruction Set Computers) processor architecture, a RISC (Reduced Instruction Set Computer) processor architecture, and/or a MISC (Minimal Instruction Set Computer) processor architecture. Processors may provide, for example, coordination of other components computing devices, such as control of user interfaces, applications that are run by the devices, and wireless communication by the devices.

Memory can store information within computing devices, including instructions to be executed by one or more processors. Memory can include a volatile memory unit or units, such as synchronous RAM (e.g., double data rate synchronous dynamic random access memory (DDR SDRAM), DDR2 SDRAM, DDR3 SDRAM, DDR4 SDRAM), asynchronous RAM (e.g., fast page mode dynamic RAM (FPM DRAM), extended data out DRAM (EDO DRAM)), graphics RAM (e.g., graphics DDR4 (GDDR4), GDDR5). In some implementations, memory can include a non-volatile memory unit or units (e.g., flash memory). Memory can also be another form of computer-readable medium, such as magnetic and/or optical disks.

Storage devices can be capable of providing mass storage for computing devices and can include a computer-readable medium, such as a floppy disk device, a hard disk device, an optical disk device, a Microdrive, or a tape device, a flash memory or other similar solid state memory device, or an array of devices, including devices in a storage area network or other configurations. Computer program products can be tangibly embodied in an information carrier, such as memory, storage devices, cache memory within a processor, and/or other appropriate computer-readable medium. Computer program products may also contain instructions that, when executed by one or more computing devices, perform one or more methods or techniques, such as those described above.

High speed controllers can manage bandwidth-intensive operations for computing devices, while the low speed controllers can manage lower bandwidth-intensive operations. Such allocation of functions is exemplary only. In some implementations, a high-speed controller is coupled to memory, display (e.g., through a graphics processor or accelerator), and to high-speed expansion ports, which may accept various expansion cards; and a low-speed controller is coupled to one or more storage devices and low-speed expansion ports, which may include various communication ports (e.g., USB, Bluetooth, Ethernet, wireless Ethernet) that may be coupled to one or more input/output devices, such as keyboards, pointing devices (e.g., mouse, touchpad, track ball), printers, scanners, copiers, digital cameras, microphones, displays, haptic devices, and/or networking devices such as switches and/or routers (e.g., through a network adapter).

Displays may include any of a variety of appropriate display devices, such as TFT (Thin-Film-Transistor Liquid Crystal Display) displays, OLED (Organic Light Emitting Diode) displays, touchscreen devices, presence sensing display devices, and/or other appropriate display technology. Displays can be coupled to appropriate circuitry for driving the displays to output graphical and other information to a user.

Expansion memory may also be provided and connected to computing devices through one or more expansion interfaces, which may include, for example, a SIMM (Single In Line Memory Module) card interfaces. Such expansion memory may provide extra storage space for computing devices and/or may store applications or other information that is accessible by computing devices. For example, expansion memory may include instructions to carry out and/or supplement the techniques described above, and/or may include secure information (e.g., expansion memory may include a security module and may be programmed with instructions that permit secure use on a computing device).

Computing devices may communicate wirelessly through one or more communication interfaces, which may include digital signal processing circuitry when appropriate. Communication interfaces may provide for communications under various modes or protocols, such as GSM voice calls, messaging protocols (e.g., SMS, EMS, or MMS messaging), CDMA, TDMA, PDC, WCDMA, CDMA2000, GPRS, 4G protocols (e.g., 4G LTE), and/or other appropriate protocols. Such communication may occur, for example, through one or more radio-frequency transceivers. In addition, short-range communication may occur, such as using a Bluetooth, Wi-Fi, or other such transceivers. In addition, a GPS (Global Positioning System) receiver module may provide additional navigation and location-related wireless data to computing devices, which may be used as appropriate by applications running on computing devices.

Computing devices may also communicate audibly using one or more audio codecs, which may receive spoken information from a user and convert it to usable digital information. Such audio codecs may additionally generate audible sound for a user, such as through one or more speakers that are part of or connected to a computing device. Such sound may include sound from voice telephone calls, may include recorded sound (e.g., voice messages, music files, etc.), and may also include sound generated by applications operating on computing devices.

Various implementations of the systems, devices, and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) can include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor.

To provide for interaction with a user, the systems and techniques described here can be implemented on a computer having a display device (e.g., LCD display screen, LED display screen) for displaying information to users, a keyboard, and a pointing device (e.g., a mouse, a trackball, touchscreen) by which the user can provide input to the computer. Other kinds of devices can be used to provide for interaction with a user as well; for example, feedback provided to the user can be any form of sensory feedback (e.g., visual feedback, auditory feedback, and/or tactile feedback); and input from the user can be received in any form, including acoustic, speech, and/or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

The above description provides examples of some implementations. Other implementations that are not explicitly described above are also possible, such as implementations based on modifications and/or variations of the features described above. For example, the techniques described above may be implemented in different orders, with the inclusion of one or more additional steps, and/or with the exclusion of one or more of the identified steps. Additionally, the steps and techniques described above as being performed by some computing devices and/or systems may alternatively, or additionally, be performed by other computing devices and/or systems that are described above or other computing devices and/or systems that are not explicitly described. Similarly, the systems, devices, and apparatuses may include one or more additional features, may exclude one or more of the identified features, and/or include the identified features combined in a different way than presented above. Features that are described as singular may be implemented as a plurality of such features. Likewise, features that are described as a plurality may be implemented as singular instances of such features. The drawings are intended to be illustrative and may not precisely depict some implementations. Variations in sizing, placement, shapes, angles, and/or the positioning of features relative to each other are possible.

What is claimed is:

1. A method for generating information about a physical environment using point cloud data, the method comprising:
   receiving point cloud data of a physical environment, wherein the point cloud data comprises a plurality of points in three-dimensional (3D) space that approximates locations of physical surfaces within the physical environment;
   identifying points amongst the plurality of points in the point cloud data that correspond to contours of particular types of the physical surfaces within the physical environment;
   reducing the plurality of points in the point cloud data to a set of the identified points;
   generating information about the physical environment based at least in part on the set of the identified points, wherein the set of the identified points comprises the contours of the particular types of the physical surfaces within the physical environment; and
   returning the information about the physical environment.

2. The method of claim 1, wherein the method further comprises: receiving image data of the physical environment and generating the point cloud data from the image data.

3. The method of claim 1, wherein generating the information about the physical environment comprises generating a map of the physical environment.

4. The method of claim 1, wherein generating the information about the physical environment comprises determining location information for at least one of the particular types of the physical surfaces within the physical environment.

5. The method of claim 1, wherein generating the information about the physical environment comprises determining identification information for at least one of the particular types of the physical surfaces within the physical environment.

6. The method of claim 1, wherein generating the information about the physical environment comprises determining a size of the physical environment.

7. The method of claim 1, wherein generating the information about the physical environment comprises determining occupancy information for the physical environment.

8. The method of claim 1, wherein the particular types of the physical surfaces within the physical environment comprise vertical poles.

9. The method of claim 1, wherein the particular types of the physical surfaces within the physical environment comprise racks.

10. The method of claim 1, wherein the particular types of the physical surfaces within the physical environment comprise doorways.

11. The method of claim 1, wherein the particular types of the physical surfaces within the physical environment comprise vehicles or human workers.

12. The method of claim 1, wherein the physical environment comprises a facility or a warehouse.

13. The method of claim 1, wherein the method further comprises: aligning the point cloud data with a width of a predetermined surface in the physical environment to determine an orientation of the point cloud data that corresponds to an orientation of the physical environment.

14. The method of claim 1, wherein the method further comprises: classifying the points in the set of the identified points as corresponding to at least one of the particular types of the physical surfaces within the physical environment.

15. The method of claim 1, wherein reducing the plurality of points in the point cloud data to the set of the identified points comprises removing other points from the plurality of points in the point cloud data that do not correspond to the contours of the particular types of the physical surfaces within the physical environment.

16. A system for generating information about a physical environment using point cloud data, the system comprising:
an imaging device positioned within a physical environment, wherein the imaging device is configured to generate two-dimensional (2D) data of the physical environment; and
a computer system in network communication with the imaging device, the computer system comprising one or more processors and memory to generate information about the physical space based on the 2D data captured by the imaging device, wherein the one or more processors are configured to execute operations comprising:
receiving the 2D data from the imaging device;
generating point cloud data of the physical environment from the 2D data, wherein the point cloud data comprises a plurality of points in 3D space that approximates locations of physical surfaces within the physical environment;
identifying points amongst the plurality of points that correspond to contours of particular types of the physical surfaces within the physical environment;
reducing the plurality of points in the point cloud data to a set of the identified points;
generating information about the physical environment based on the set of the identified points; and
returning the information about the physical environment.

17. The system of claim 16, wherein the imaging device comprises a camera or a drone.

18. The system of claim 16, wherein the physical environment comprises a facility or a warehouse.

19. The system of claim 16, wherein generating the information about the physical environment comprises generating a map of the physical environment.

20. The system of claim 16, wherein generating the information about the physical environment comprises determining a size or an occupancy of the physical environment.

* * * * *